United States Patent
Pearson et al.

(10) Patent No.: US 11,964,549 B2
(45) Date of Patent: Apr. 23, 2024

(54) MULTIPLE COOLING CIRCUIT SYSTEMS AND METHODS FOR USING THEM

(71) Applicant: BP P.L.C., London (GB)

(72) Inventors: Richard Pearson, Reading (GB); Giles Michael Derek Prentice, Reading (GB); Jonathan Andrew Salkeld, Reading (GB); Kevin Richard West, Reading (GB)

(73) Assignee: BP P.L.C., London (GB)

( * ) Notice: Subject to any disclaimer, the term of this patent is extended or adjusted under 35 U.S.C. 154(b) by 589 days.

(21) Appl. No.: 17/257,558

(22) PCT Filed: Jul. 3, 2019

(86) PCT No.: PCT/EP2019/067922
§ 371 (c)(1),
(2) Date: Dec. 31, 2020

(87) PCT Pub. No.: WO2020/007955
PCT Pub. Date: Jan. 9, 2020

(65) Prior Publication Data
US 2021/0362580 A1    Nov. 25, 2021

(30) Foreign Application Priority Data

Jul. 4, 2018    (GB) .................................... 1811003

(51) Int. Cl.
*B60K 1/04*    (2019.01)
*B60H 1/00*    (2006.01)
(Continued)

(52) U.S. Cl.
CPC ........... *B60K 1/04* (2013.01); *B60H 1/00278* (2013.01); *B60H 1/00392* (2013.01);
(Continued)

(58) Field of Classification Search
CPC ........... B60K 1/04; B60L 50/56; B60L 58/26; B60H 1/00278; B60H 1/00392
See application file for complete search history.

(56) References Cited

U.S. PATENT DOCUMENTS 5,424,519 A    6/1995 Salee
5,814,595 A    9/1998 Flynn et al.
(Continued)

FOREIGN PATENT DOCUMENTS

CN    102946983 A    2/2012
CN    203856565 U    10/2014
(Continued)

OTHER PUBLICATIONS

Zhoujian et al. "A review on lithium-ion power battery thermal management technologies and thermal safety", Journal of Thermal Science, 2017, 26(5), p. 391-412.
(Continued)

*Primary Examiner* — Michael Jung
(74) *Attorney, Agent, or Firm* — McDonnell Boehnen Hulbert & Berghoff LLP

(57) ABSTRACT

This disclosure relates generally to thermal management fluid systems. This disclosure relates more particularly to dielectric thermal management fluid systems useful in cooling electronic devices such as lithium-ion batteries, and methods of using such thermal management fluids.

17 Claims, 7 Drawing Sheets

(51) Int. Cl.
  *B60L 50/60* (2019.01)
  *B60L 58/26* (2019.01)
  *B60K 1/00* (2006.01)

(52) U.S. Cl.
  CPC ............... *B60L 50/66* (2019.02); *B60L 58/26* (2019.02); *B60H 2001/00307* (2013.01); *B60K 2001/005* (2013.01)

(56) References Cited

U.S. PATENT DOCUMENTS

| | | |
|---|---|---|
| 6,515,031 B2 | 2/2003 | Fefer |
| 9,541,135 B2 | 1/2017 | Tsuna |
| 9,555,380 B2 | 1/2017 | Dahms et al. |
| 10,128,550 B2 | 11/2018 | Lebreux et al. |
| 10,217,979 B2 | 2/2019 | Harris et al. |
| 2004/0110050 A1 | 6/2004 | Abd et al. |
| 2005/0061497 A1 | 3/2005 | Amaral et al. |
| 2005/0167169 A1 | 8/2005 | Gering et al. |
| 2008/0011979 A1 | 1/2008 | Davidson et al. |
| 2008/0272331 A1 | 11/2008 | Mohapatra et al. |
| 2009/0176148 A1 | 7/2009 | Jiang et al. |
| 2009/0242829 A1 | 10/2009 | Davidson et al. |
| 2010/0071881 A1 | 3/2010 | Murer et al. |
| 2010/0108936 A1 | 5/2010 | Kaneko |
| 2011/0073282 A1 | 3/2011 | Guelles et al. |
| 2011/0088418 A1 | 4/2011 | Kontomaris et al. |
| 2012/0209838 A1 | 8/2012 | Dean et al. |
| 2012/0263980 A1 | 10/2012 | Soukhojak et al. |
| 2013/0037741 A1 | 2/2013 | Birnbaum et al. |
| 2013/0104548 A1 | 5/2013 | Kontomaris |
| 2013/0256586 A1 | 10/2013 | Kramer et al. |
| 2013/0337341 A1 | 12/2013 | Tikhonov et al. |
| 2014/0079978 A1 | 3/2014 | Al-Hallaj et al. |
| 2014/0216688 A1 | 8/2014 | Shelnutt et al. |
| 2016/0163412 A1 | 6/2016 | Walker |
| 2016/0325598 A1 | 11/2016 | Schumann et al. |
| 2016/0333241 A1 | 11/2016 | Fukushima et al. |
| 2017/0105313 A1* | 4/2017 | Shedd ................. H05K 7/20809 |
| 2018/0048037 A1* | 2/2018 | Newman ........... H01M 10/6561 |
| 2018/0363989 A1 | 12/2018 | Elie et al. |
| 2019/0120563 A1 | 4/2019 | Nguyen et al. |
| 2021/0057793 A1 | 2/2021 | Antonius et al. |

FOREIGN PATENT DOCUMENTS

| | | |
|---|---|---|
| CN | 106785222 A | 5/2017 |
| CN | 105622959 B | 8/2018 |
| EP | 3367495 A1 | 8/2018 |
| JP | H02246255 A | 10/1990 |
| JP | 2003-533844 A | 11/2003 |
| JP | 2006083276 A | 3/2006 |
| JP | 2008115266 A | 5/2008 |
| JP | 2010132792 A | 6/2010 |
| JP | 2012184360 A | 9/2012 |
| JP | 2015-021117 A | 2/2015 |
| JP | 2016-188349 A | 11/2016 |
| JP | 2018124017 A | 8/2018 |
| JP | H 9-503801 A | 2/2022 |
| WO | 2001065626 A2 | 9/2001 |
| WO | 2005007771 A1 | 1/2005 |
| WO | 2013077379 A1 | 5/2013 |
| WO | 2016150925 A1 | 9/2016 |
| WO | 2018/007611 A1 | 1/2018 |

OTHER PUBLICATIONS

James-Smith et al. "A novel method to quantify the amount of surfactant at the oil/water interface and to determine total interfacial area of emulsions." Journal of Colloid and Interface Science, 2007, 310(2), p. 590-598.

International Search Report and Written Opinion of International Application No. PCT/EP2019/067921, dated October, 9, 2019. 14 pages.

International Search Report and Written Opinion of International Application No. PCT/EP2019/067922, dated Oct. 15, 2019. 11 pages.

Search Report of GB Application No. 1811002.3, dated Mar. 1, 2019. 4 pages.

Search Report of GB Application No. 1811003.1, dated Mar. 1, 2019. 5 pages.

3M Thermal Management Fluids. "Safe Sustainable Cooling Performance: Dielectric heat transfer solutions for the electronics industry." Apr. 2009, 8 pages.

3M Two-Phase Immersion Cooling "3M Two-Phase Immersion Cooling—High Level Best Practices for System Fabrication" Nov. 2014, 4 pages.

DryTech "ZEOZORB Series Transformer Breather for Power Transformers." Nov. 2014, 1 page.

Hillard HILCO Division "HILCO Filter Cartridges: Revolutionizing the Filtration Industry." Nov. 6, 2012, 12 pages.

International Search Report and Written Opinion of International Application No. PCT/EP2020/060909, dated Jul. 8, 2020, 9 pages.

Search Report of GB Application No. 1905733.0, completed Oct. 31, 2019, 1 page.

Chen et al. Comparison of different cooling methods for lithium ion battery cells. Applied Thermal Engineering, 2016, vol. 94, pp. 846-854.

Sharma et al. Review on thermal energy storage with phase change materials and applications. Renewable and Sustainable Energy Reviews, 2009, vol. 13 No. 2, pp. 318-345.

International Search Report and Written Opinion of the International Searching Authority for International Application No. PCT/EP2019/050260, dated Feb. 28, 2019.

European Search Report and Opinion for European U.S. Appl. No. 18/150,501, dated May 18, 2018.

\* cited by examiner

MULTIPLE COOLING CIRCUIT SYSTEMS AND METHODS FOR USING THEM

This application is a national stage application under 35 U.S.C. § 371 of International Application No. PCT/EP2019/067922, filed Jul. 3, 2019, which claims priority to Great Britain Application No. 1811003.1, filed Jul. 4, 2018, the disclosures of which are explicitly incorporated by reference herein.

BACKGROUND OF THE DISCLOSURE

Field of the Disclosure

This disclosure relates generally to thermal management fluid systems. This disclosure relates more particularly to dielectric thermal management fluid systems useful in cooling electronic devices such as lithium-ion batteries, and methods of using such thermal management fluids.

Technical Background

It is estimated that an increased number of electric vehicles (i.e., vehicles using electric power for all or a portion of their motive power such as battery electric vehicles (BEVs), hybrid electric vehicles (HEVs), plug-in hybrid electric vehicles (PHEVs), and the like) will be sold globally. Ultimately, the vast majority of vehicles will likely be electric. As electric vehicle technology continues to evolve, there is a need to provide improved power sources (e.g., battery systems or modules). For example, it is desirable to increase the distance that such vehicles may travel without the need to recharge the batteries, to improve the performance of such batteries, and to reduce the costs and time associated with battery charging.

Currently, battery-powered electric vehicles almost exclusively use lithium-ion battery technology. Lithium-ion batteries offer many advantages over the comparable nickel-metal-hydride batteries, but as compared to nickel-metal-hydride batteries, lithium-ion batteries are more susceptible to variations in battery temperature and thus have more stringent thermal management requirements. For example, optimal lithium-ion battery operating temperatures are in the range of 10 and 35° C. Operation is increasingly inefficient as temperatures rise from 35 to 70° C., and, more critically, operation at these temperatures damages the battery over time. Temperatures over 70° C. present significant risk of thermal runaway. As a result, lithium-ion batteries require systems to regulate their temperatures during vehicle operation. In addition, during charging, up to 10% of the inputted power ends up as heat. As the fast charging of lithium-ion batteries becomes more common, the need remains for efficient systems for thermal management of the batteries.

Batteries may be cooled by direct or indirect cooling. Direct cooling advantageously allows the thermal management fluid (i.e., cooling fluid) to come into direct contact with the "hot" components. In indirect cooling, the electrically "hot" component is shielded by an electrically insulating barrier and the cooling fluid removes heat passing through this barrier. Most common cooling fluids are water-glycol. But because water-based fluids conduct electricity, they cannot be used in applications where the cooling fluid comes into direct contact with electrically "hot" components. Indirect cooling, on the other hand, allows for the water-based coolants to be used but it creates a bottleneck for the cooling process which can be limiting. Dielectric coolants are non-electrically conductive fluids that are used for cooling. Generally, the thermal properties of dielectric fluids are poor in comparison to water-glycol. But unlike water-glycol fluids, dielectric coolants can be used in direct cooling applications.

Thus, there remains a need for an improved system, especially those suitable for use in the cooling of lithium-ion batteries.

SUMMARY OF THE DISCLOSURE

One aspect of the disclosure provides a system including: a heat source (e.g., an electric heat source); a first heat exchanger having a first portion and a second portion; a first fluid circuit in substantial thermal contact with the heat source and configured to circulate a first thermal management fluid between the heat source and the first portion of the first heat exchanger, wherein the first fluid circuit is configured such that the first thermal management fluid can absorb heat from the heat source and can dissipate heat in the first heat exchanger; and a second fluid circuit configured to pass a second thermal management fluid over the second portion of the first heat exchanger and absorb heat therefrom, wherein (a) the first thermal management fluid includes: one or more dielectric fluids present in a total amount in the range of 65 wt % to 99.9 wt %; and one or more halocarbons each having a boiling point in the range of 30° C. to 150° C., present in a total amount in the range of 0.1 wt % to 35 wt %, wherein the one or more halocarbons are homogeneously dispersed in the first thermal management fluid; wherein the dielectric thermal management fluid has a dielectric constant of at least 1.5 at 25° C.; and wherein a flash point of the first thermal management fluid is above the boiling point of the one or more halocarbons; and/or (b) the second thermal management fluid includes: an aqueous carrier fluid; and a dispersion of micelles within the aqueous carrier fluid, wherein each micelle comprises a solid hydrophobic core particle comprising a phase change material having a melting point in the range of 30° C. to 100° C. and one or more emulsifiers forming a micellar shell around the solid hydrophobic core particle.

In one embodiment of the system of the disclosure, the heat source is an electric heat source.

Another aspect of the disclosure provides a method including circulating a first thermal management fluid in a first fluid circuit and between a heat source and a first portion of a first heat exchanger; absorbing thermal energy in the first thermal management fluid from the heat source; dissipating thermal energy from the first thermal management fluid into the first heat exchanger; and circulating a second thermal management fluid in a second fluid circuit and over a second portion of the first heat exchanger; and absorbing heat from the first exchanger into the second thermal management fluid; wherein (a) the first thermal management fluid includes: one or more dielectric fluids present in a total amount in the range of 65 wt % to 99.9 wt %; and one or more halocarbons each having a boiling point in the range of 30° C. to 150° C., present in a total amount in the range of 0.1 wt % to 35 wt %, wherein the one or more halocarbons are homogeneously dispersed in the first thermal management fluid; wherein the dielectric thermal management fluid has a dielectric constant of at least 1.5 at 25° C.; and wherein a flash point of the first thermal management fluid is above the boiling point of the one or more halocarbons; and/or (b) the second thermal management fluid includes: an aqueous carrier fluid; and a dispersion of micelles within the aqueous carrier fluid, wherein each micelle comprises a solid hydrophobic core particle comprising a phase change material having a melting point in the range of 30° C. to 100° C. and one or more emulsifiers forming a micellar shell around the solid hydrophobic core particle.

BRIEF DESCRIPTION OF THE DRAWINGS

The accompanying drawings are included to provide a further understanding of the compositions and methods of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Figure 1A:
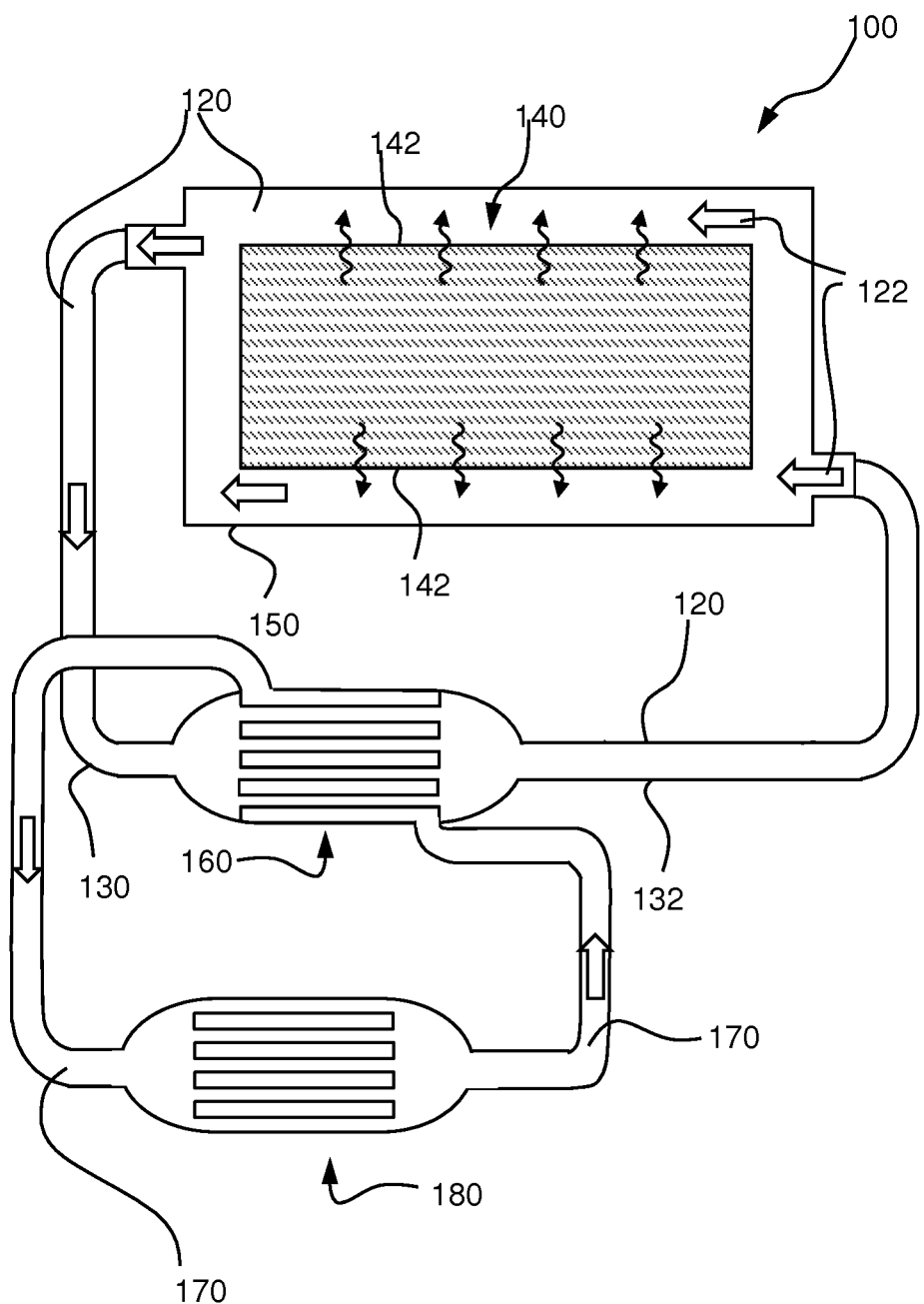
FIG. 1A is a schematic cross-sectional view of a system according to an embodiment of the disclosure.

The particulars shown herein are by way of example and for purposes of illustrative discussion of certain embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice. Thus, before the disclosed processes and devices are described, it is to be understood that the aspects described herein are not limited to specific embodiments, apparatus, or configurations, and as such can, of course, vary. It is also to be understood that the terminology used herein is for the purpose of describing particular aspects only and, unless specifically defined herein, is not intended to be limiting.

The terms "a," "an," "the" and similar referents used in the context of describing the invention (especially in the context of the following embodiments and claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All methods described herein can be performed in any suitable order of steps unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

As will be understood by one of ordinary skill in the art, each embodiment disclosed herein can comprise, consist essentially of or consist of its particular stated element, step, ingredient or component. As used herein, the transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment.

All percentages, ratios and proportions herein are by weight, unless otherwise specified.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Some embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

The present inventors have noted that, in certain cases, desirable systems would utilize thermal management fluids that have a high capacity to carry heat away in a temperature range relevant to operation of a particular electrical device or system (e.g., a lithium-ion battery), and thermal management fluids having sufficiently high dielectric constant to be suitable for use in direct cooling of the device or system. Moreover, because there is always a risk that oxygen might enter the overall system, the desirable systems would use thermal management fluids that advantageously have a high or ideally no flash point, to reduce the risk of ignition.

The present inventors have identified systems that utilize at least two thermal management circuits that allow for both direct and indirect cooling. Specifically, the present inventors recognized that a direct cooling, dielectric thermal management circuit may be further cooled using a indirect thermal management circuit, which need not use a dielectric thermal management fluid. Additionally, cooling the dielectric thermal management fluid in the direct cooling circuit would result in more efficient cooling.

In general, the aspects and embodiments of the disclosure provide improvements in systems that utilize at least two thermal management circuits. Such systems allow for use of both direct and indirect cooling. Specifically, the present inventors recognized that direct cooling, dielectric thermal management circuit may be further cooled using a superior water based, indirect thermal management circuit. Additionally, cooling the dielectric thermal management fluid in the direct cooling circuit would result in the more efficient cooling.

Thus, one aspect of the disclosure provides a system including: a heat source (e.g., an electric heat source); a first heat exchanger having a first portion and a second portion; a first fluid circuit in substantial thermal contact with the heat source and configured to circulate a first thermal management fluid between the heat source and the first portion of the first heat exchanger, wherein the first fluid circuit is configured such that the first thermal management fluid can absorb heat from the heat source and can dissipate heat in the first heat exchanger; and a second fluid circuit configured to pass a second thermal management fluid over the second portion of the first heat exchanger and absorb heat therefrom, wherein the first thermal management fluid and the second thermal management fluid are as described below.

An embodiment of the system of the disclosure is illustrated with reference to FIG. 1A. A system 100 is shown in a schematic cross-sectional side view in FIG. 1A. The system 100 includes a first thermal management fluid 120 that is circulated through the circuit and passes over surface 142. The temperature of surface 142 is elevated in comparison to the temperature of first thermal management fluid 120. As a result, thermal energy is absorbed in first thermal management fluid 120 from surface 142. Further, first thermal management fluid 120 flows through path 122 absorbing thermal energy from electrical component 140. From fluid path 122, the thermal management fluid 120 flows through a first duct 130 to heat exchanger 160. Thermal energy that has accumulated in first thermal management fluid 120 is removed from the fluid within heat exchanger 160 before the fluid flows through a second duct 132 to electrical component 140. In heat exchanger 160, thermal energy of first thermal management fluid 120 is absorbed by a second thermal management fluid 170.

In certain embodiments, system 100 includes a second heat exchanger 180. For example, in certain embodiments, thermal energy that has accumulated in second thermal management fluid 170 is removed from the fluid within second heat exchanger 180 before the fluid flows through to heat exchanger 160.

In certain embodiments as otherwise described herein, the system includes a heat source that is an electrical heat source. Thus, the system produces the thermal energy by operating an electrical component. For example, system 100 is associated with electrical component 140, which produces heat during operation. In certain embodiments the heat is produced as elements of the electrical component charge and discharge. As will be understood by those of ordinary skill in the art, inefficiencies in the operation of the electrical component and resistances in the circuits corresponding circuits create heat as current passes through the circuits and elements of the electrical component. For example, the heat from the operation of electrical component 140 causes surface 142 to rise in temperature, which then results in the transfer of thermal energy to first thermal management fluid 120. In other embodiments, the thermal energy is produced by a chemical reaction, such as an exothermic reaction, or by friction. In still other embodiments, the first thermal management fluid is chilled and absorbs thermal energy from surfaces at ambient or slightly elevated temperatures.

In certain embodiments as otherwise described herein, the surface is a surface of the electrical component. For example, in FIGS. 1A and 1B a housing of 150 of electrical component 140 contains a reservoir of first thermal management fluid 120. Elements of the electrical component including certain circuits that produce heat is submerged in first thermal management fluid 120 and the first thermal management fluid absorbs thermal energy directly from an outside surface 142 of the electrical component 140. In certain embodiments as otherwise described herein, the electrical component includes a battery pack, a capacitor, inverter, electrical cabling, a fuel cell, a motor, or a computer. For example, in certain embodiments the electrical component is a battery pack that includes one or more electrochemical cells disposed in a housing. In certain embodiments as otherwise described herein, the battery pack is a component of an electric vehicle. In some embodiments, the electric vehicle is a fully electric vehicle or a hybrid electric vehicle. In other embodiments the battery pack is part of a stationary energy storage solution, for example a home energy storage solution that operates in cooperation with local renewable energy sources, such as solar panels or wind turbines. In other embodiments the electrical component is one or more capacitors, such as an electrolytic capacitor or an electric double-layer capacitor, e.g., a supercapacitor. In still other embodiments, the electrical component is one or more fuel cells, such as a polymer electrolyte membrane fuel cell, a direct methanol fuel cell, an alkaline fuel cell, a phosphoric acid fuel cell, a molten carbonate fuel cell, a solid oxide fuel cell, or a reversible fuel cell. In certain embodiments the electrical component is an electric motor. Still in other embodiments, the electrical component is a computer, for example a personal computer or a server.

Figure 2:
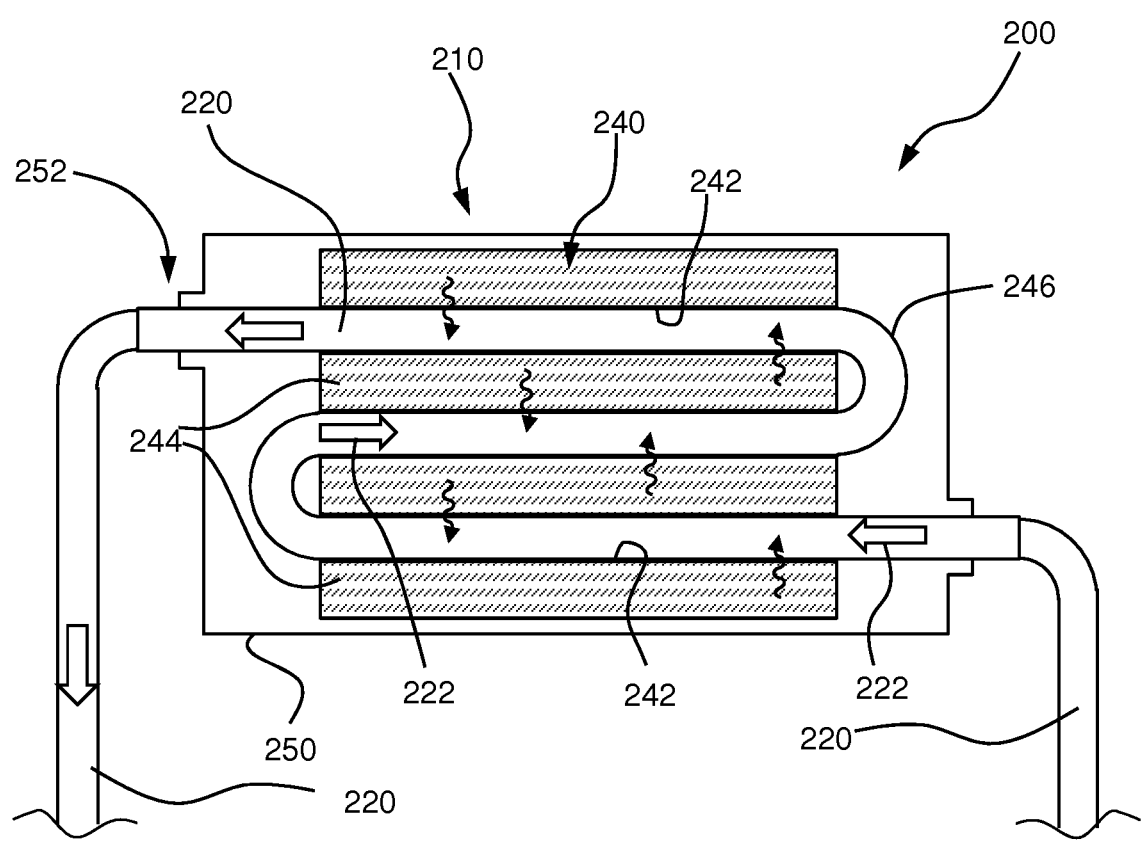
FIG. 2 is a partial schematic cross-sectional view of a system circuit according to another embodiment of the disclosure.

In certain embodiments as otherwise described herein, the surface is an internal surface of a conduit. For example, FIG. 2 shows a partial view of a system 200 that includes electrical component 240 that includes a plurality of individual units 244. In particular, the electrical component 240 is a battery that includes a plurality of electrochemical cells 244. Electrical component 240 further includes a conduit 246 that extends through the inside of the electrical component and between the electrochemical cells 244. As the electrical component produces thermal energy, the internal surface 242 of the conduit 246 is heated and the thermal energy is absorbed by first thermal management fluid 220. In certain embodiments as otherwise described herein, the conduit passes through a housing that surrounds the electrical component. For example, conduit 246 in system 200 extends through apertures 252 in the housing 250 surrounding electrical component 240, which allow first thermal management fluid 220 to be conveyed to other elements of the system 200.

In certain embodiments as otherwise described herein, the electrochemical cells are rechargeable electrochemical cells, such as lithium-ion electrochemical cells. In other embodiments, the electrochemical cells are aluminum ion cells, lead-acid cells, or magnesium ion cells.

In certain embodiments as otherwise described herein, the system of the disclosure can also include a first pump configured to circulate the first thermal management fluid. In one non-limiting example of the system 100 illustrated in FIG. 1B, first pump 165 passes first thermal management fluid 120, which is received from second duct 132, through a third duct 134 returning it to fluid path 122 surrounding electrical component 140. One of skill in the art will recognize that the first pump may be placed at different parts of the system depending on the need and design of the system, and that the system may include one or more first pumps. For example, the first duct 130 may be configured to include the first pump.

In certain embodiments as otherwise described herein, the system of the disclosure can also include a second pump configured to circulate the second thermal management fluid. In one non-limiting example of the system 100 illustrated in FIG. 1B, second pump 185 may be configured to circulate second thermal management fluid 170. One of skill in the art will recognize that the second pump may be placed at different parts of the system depending on the need and design of the system, and that the system may include one or more second pumps. In one non-limiting example illustrated in FIG. 1B, second pump 185 is placed before second heat exchanger 180. In another example, the second pump may be placed after the second heat exchanger.

Figure 1B:
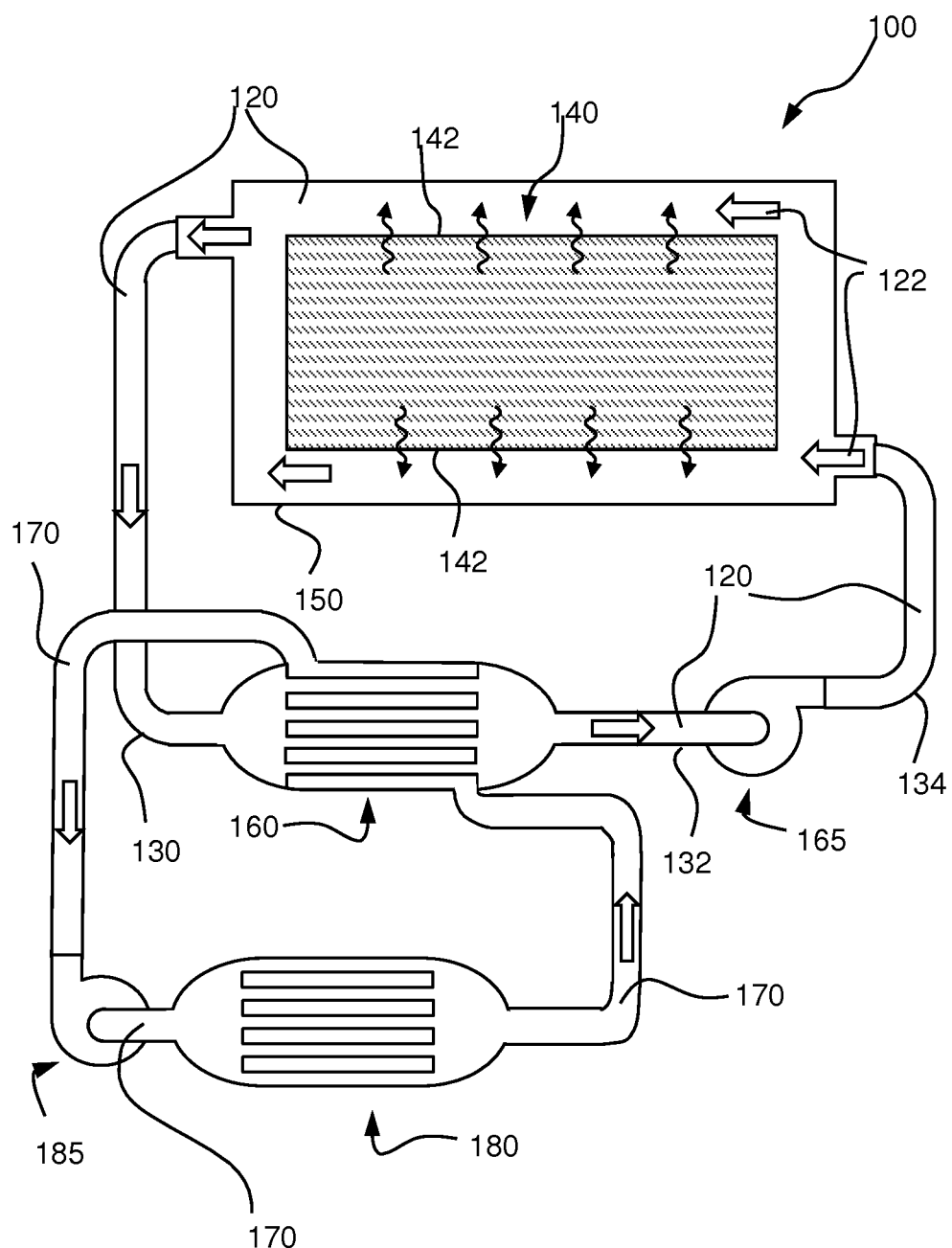
FIG. 1B is a schematic cross-sectional view of a system according to an embodiment of the disclosure.

System 100, shown in FIG. 1A and FIG. 1B, is a schematic depiction of an uncomplicated embodiment employing the described thermal management fluid. In other embodiments, the thermal management circuit includes additional elements, such as any combination of valves, pumps, heat exchangers, reservoirs and ducts.

Figure 3A:
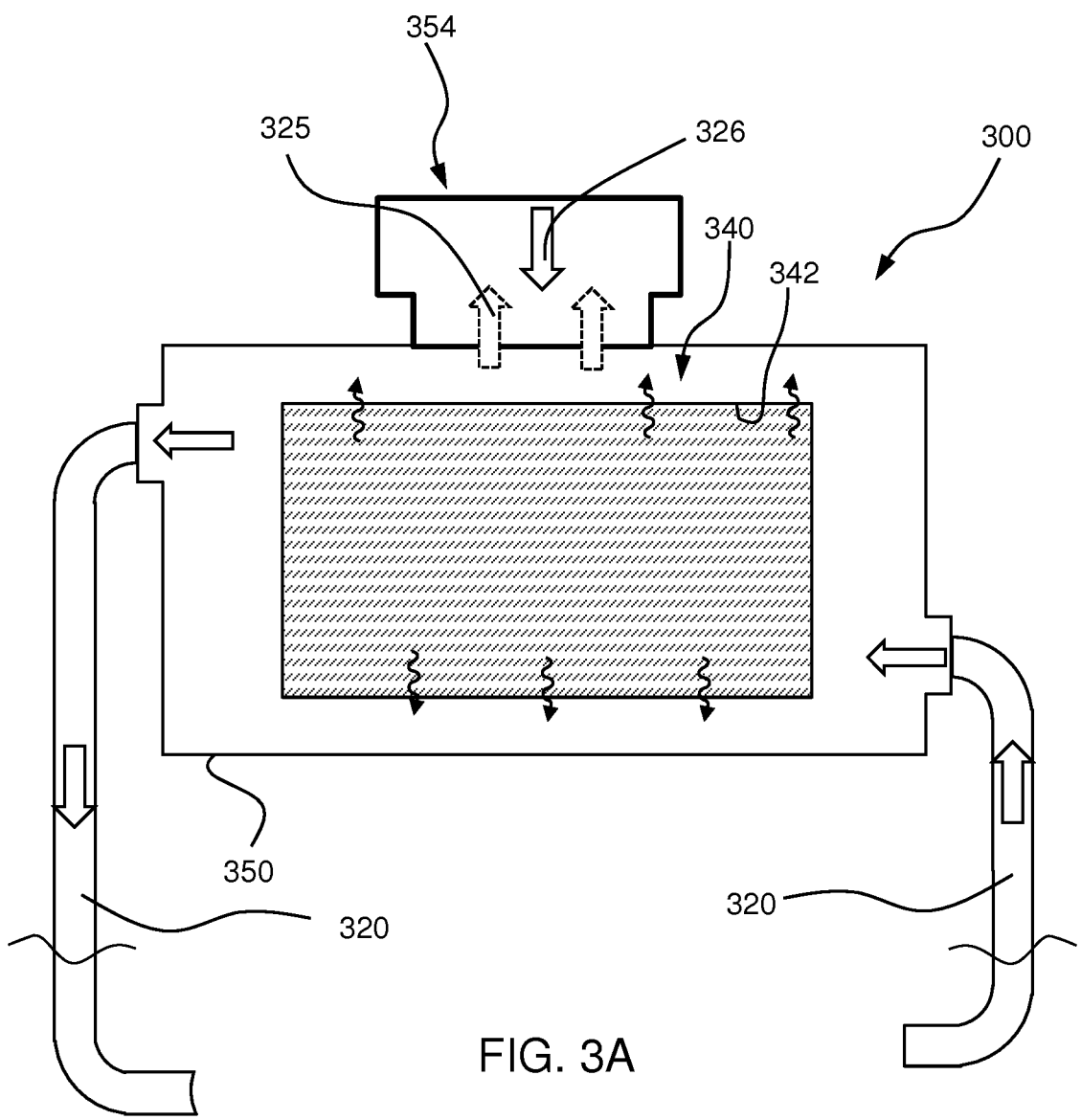
FIG. 3A is a partial schematic cross-sectional view of a system circuit according to another embodiment of the disclosure.
Figure 3B:
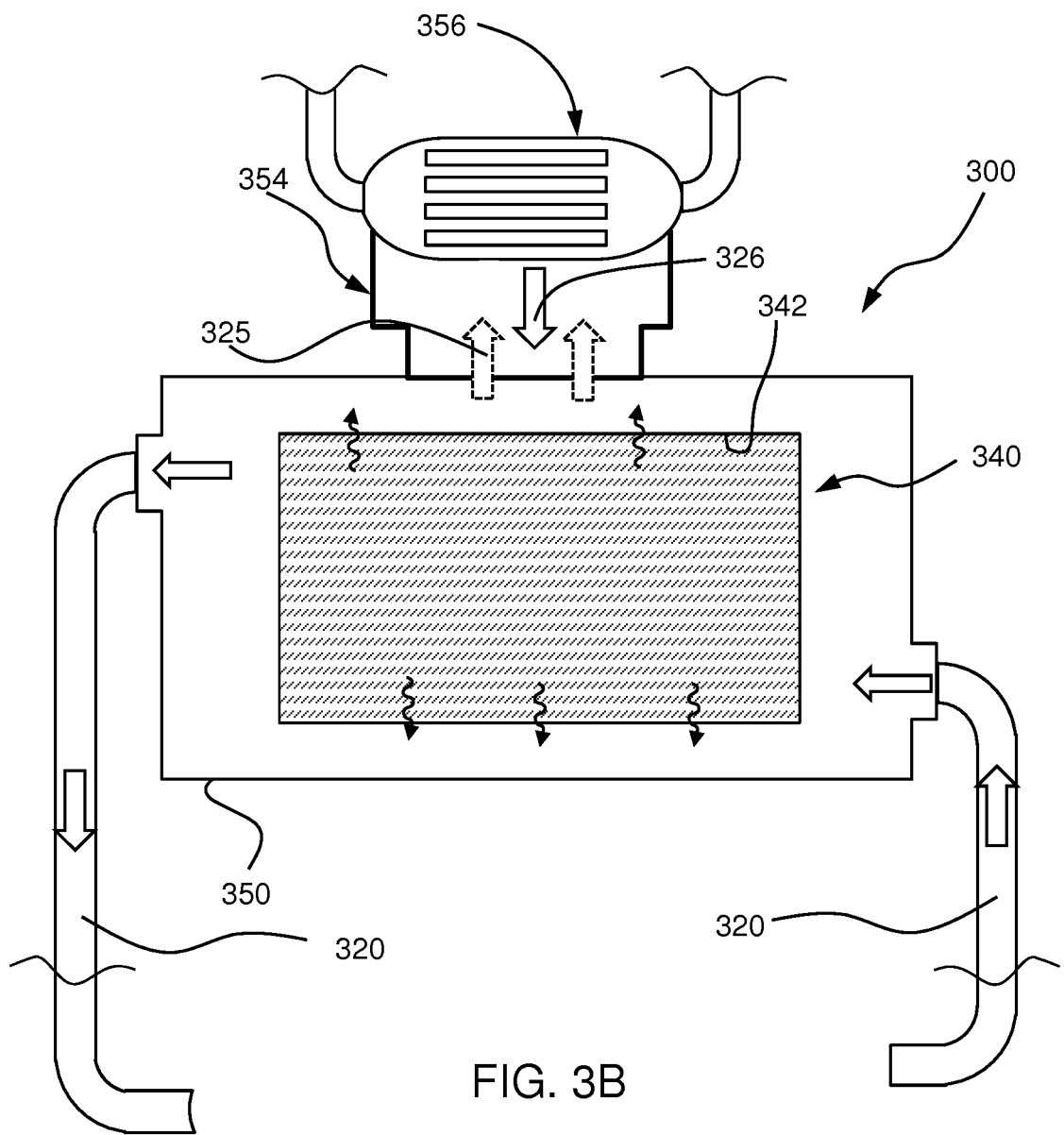
FIG. 3B is a partial schematic cross-sectional view of a system circuit according to another embodiment of the disclosure.

The present inventors recognized that certain thermal management fluids can undergo a phase change (i.e., liquid to gas) at temperatures relevant to the operation of systems of the disclosure. Therefore, in certain embodiments as otherwise described herein, the first fluid circuit may comprise an expansion chamber. The expansion chamber is configured to receive a vapor from the first thermal management fluid. For example, in certain embodiments, the expansion chamber is configured to receive a halocarbon vapor from vaporization of the first thermal management fluid comprising a halocarbon component. For example, FIG. 3A shows a partial view of a system 300 that includes expansion chamber 354 configured to receive a vapor component 325 from the first thermal management fluid. Housing 350 surrounds electrical component 340 and provides a cavity for first thermal management fluid 320, which fluid absorbs thermal energy directly from an outside surface 342. The phase change of first thermal management fluid 320 to vapor component 325 can be used in a cooling system, with the latent heat of vaporization being used to provide cooling of the electrical component. In certain embodiments, the vapor from the first thermal management fluid can condense into a liquid phase 326, ready to be revaporized during subsequent heating cycles of the first thermal management fluid. In certain embodiments, the vapor from the first thermal management fluid can condense into a liquid phase 326 through a drop in temperature of the component being cooled. In certain embodiments, the vapor from the first thermal management fluid can condense into a liquid phase using external cooling, such as on a heat exchanger. As illustrated by FIG. 3B, system 300 may include a third heat exchanger 356. The third heat exchanger may have a first portion and a second portion, where the first portion of the third heat exchanger is configured to absorb heat from the expansion chamber and the second portion of the third heat exchanger is configured to dissipate heat from the first portion of the third heat exchanger.

In certain embodiments as otherwise described herein, the third heat exchanger is a part of the second fluid circuit. For example, the second fluid circuit may include the second portion of the third heat exchanger, wherein the second portion of the third heat exchanger is configured to receive the second thermal management fluid that can absorb heat from the expansion chamber through the second portion of the third heat exchanger and can dissipate heat in the second heat exchanger.

Figure 4:
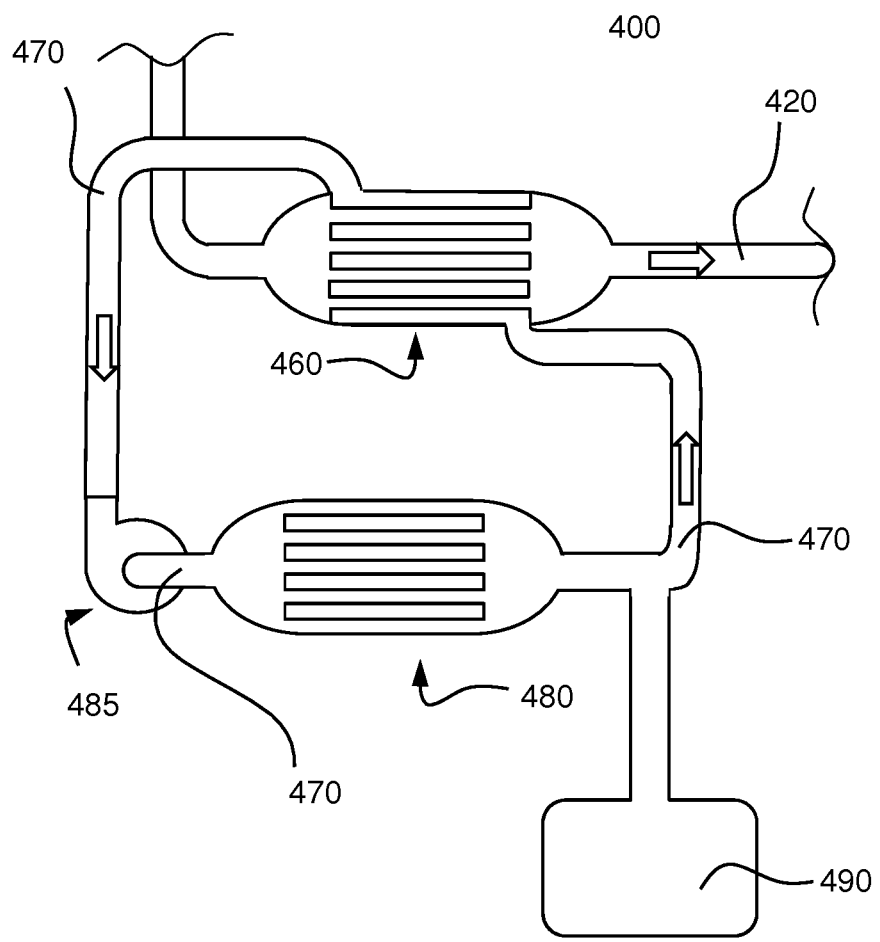
FIG. 4 is a partial schematic cross-sectional view of a system circuit according to another embodiment of the disclosure.

In certain embodiments as otherwise described herein, the system may further include a molten storage chamber. For example, FIG. 4 shows a partial view of a system 400 that includes molten storage chamber 490 configured to store a molten phase change material of the second thermal management fluid 470. In some embodiments, molten storage chamber 490 may be insulated. In certain embodiments, for example at low temperatures, molten phase second thermal management fluid 470 may be recruited to heat up first thermal management fluid 420 in first heat exchanger 460. The heated first thermal management fluid 420 may be used to heat the battery. Optional second pump 485 may be used to circulate second thermal management fluid 470. In some embodiments, second heat exchanger 480 may be used to input additional heat into the system during low temperature operations. In some embodiments, for example once the system is sufficiently warmed to the operating temperature, second heat exchanger 480 may be used to remove thermal energy that has accumulated in second thermal management fluid 470.

In certain embodiments as otherwise described herein, the third heat exchanger comprises a third fluid circuit. The third fluid circuit may be configured to circulate a third thermal management fluid that can absorb heat from the expansion chamber through the second portion of the third heat exchanger. In certain embodiments, the third thermal management fluid and can dissipate heat through a drop in temperature of the third fluid circuit apparatus (e.g., cooling by ambient temperature surrounding the third fluid circuit). In certain embodiments, the third fluid circuit may include a fourth heat exchanger, wherein the third thermal management fluid can dissipate heat in the fourth heat exchanger that was absorbed from the expansion chamber through the second portion of the third heat exchanger.

Another aspect of the disclosure provides method including: circulating a first thermal management fluid in a first fluid circuit and between an electrical heat source (e.g., a battery pack, a capacitor, inverter, electrical cabling, a fuel cell, a motor, or a computer) and a first portion of a first heat exchanger; absorbing thermal energy in the first thermal management fluid from the heat source; dissipating thermal energy from the first thermal management fluid into the first heat exchanger; circulating a second thermal management fluid in a second fluid circuit and over a second portion of the first heat exchanger; and absorbing heat from the first exchanger into the second thermal management fluid; wherein the first thermal management fluid and the second thermal management fluid are as described below.

In certain embodiments, for example, the thermal energy from the heat source is absorbed at least in part by vaporizing one or more of the one or more components of the first thermal management fluid that is heated through the boiling point(s) of one or more of the one or more the components. In certain embodiments, the method of the disclosure as otherwise described herein further includes receiving a vapor from the first thermal management fluid (e.g., from vaporization of a halocarbon component of the first thermal management fluid) in an expansion chamber of the first circuit. The method of the disclosure as otherwise described herein may, in certain embodiments, include absorbing of energy from the expansion chamber to condense the vapor from the first thermal management fluid. For example, condensing the vapor may further include cooling the expansion chamber by ambient temperature surrounding the expansion chamber.

The circulating of the first thermal management fluid over the electrical heat source can be performed, e.g., by pumping or otherwise flowing the fluid over the electrical heat source.

The thermal energy of the heat source can vary, and thus the first thermal management fluid can be adapted for use with a variety of temperatures. In certain embodiments, the heat source is at a temperature in the range of 30° C. to 150° C., e.g., 30° C. to 100° C., or 30° C. to 90° C., or 30° C. to 85° C., or 30° C. to 80° C., or 30° C. to 75° C., or 30° C. to 70° C. In certain embodiments as otherwise described herein, the heat source is at a temperature in the range of 40° C. to 150° C., e.g., 50° C. to 150° C., or 60° C. to 150° C., or 70° C. to 150° C., or 80° C. to 150° C., or 90° C. to 150° C., or 100° C. to 150° C., or 110° C. to 150° C., or 30° C. to 100° C., or 40° C. to 100° C., or 50° C. to 100° C., or 60° C. to 100° C., or 70° C. to 100° C., or 80° C. to 100° C., or 30° C. to 90° C., or 40° C. to 90° C., or 50° C. to 90° C., or 60° C. to 90° C., or 30° C. to 85° C., or 40° C. to 85° C., or 45° C. to 85° C., or 50° C. to 85° C., or 60° C. to 85° C., or 30° C. to 80° C., or 40° C. to 80° C., or 45° C. to 80° C., or 50° C. to 80° C., or 60° C. to 80° C., or 30° C. to 75° C., or 40° C. to 75° C., or 45° C. to 75° C., or 50° C. to 75° C., or 60° C. to 75° C., or 30° C. to 70° C., or 40° C. to 70° C., or 45° C. to 70° C., or 50° C. to 70° C., or 60° C. to 70° C., or 65° C. to 75° C. The temperature of the heat source in certain embodiments (and at certain times during operation of a device or system) is within 5° C. of a boiling point of a halocarbon of the thermal management system.

In certain embodiments as otherwise described herein, the thermal energy from the first thermal management fluid is absorbed in the second thermal management fluid. For example, the thermal energy from the first thermal management fluid is dissipated into the first heat exchanger. The second thermal management fluid is then circulated in a second fluid circuit and over a second portion of the first heat exchanger. In certain embodiments, the thermal energy from the second thermal management fluid may be dissipated into a second heat exchanger.

In certain embodiments as otherwise described herein, condensing the vapor may further include absorbing energy into a third heat exchanger from the expansion chamber. The energy from the third heat exchanger may, in some embodiments, be absorbed into the second thermal management fluid by circulating the second thermal management fluid in the third heat exchanger. In some other embodiments, the energy from the third heat exchanger may be absorbed into the third thermal management fluid. For example, certain embodiments as otherwise described herein may further include circulating a third thermal management fluid in a third fluid circuit and absorbing heat energy from the third heat exchanger into the third thermal management fluid. In certain embodiments, the thermal energy from the third thermal management fluid is dissipated into a fourth heat exchanger.

The methods and the systems of the disclosure include a first thermal management fluid. In certain embodiments, the first thermal management fluid is dielectric, and includes: one or more dielectric fluids present in a total amount in the range of 65 wt % to 99.9 wt %; and one or more halocarbons each having a boiling point in the range of 30° C. to 150° C., present in a total amount in the range of 0.1 wt % to 35 wt %, wherein the one or more halocarbons are homogeneously dispersed in the first thermal management fluid; wherein the dielectric thermal management fluid has a dielectric constant of at least 1.5 at 25° C.; and wherein the first thermal management fluid has a flash point that is above the boiling point of each of the one or more halocarbons.

Figure 5:
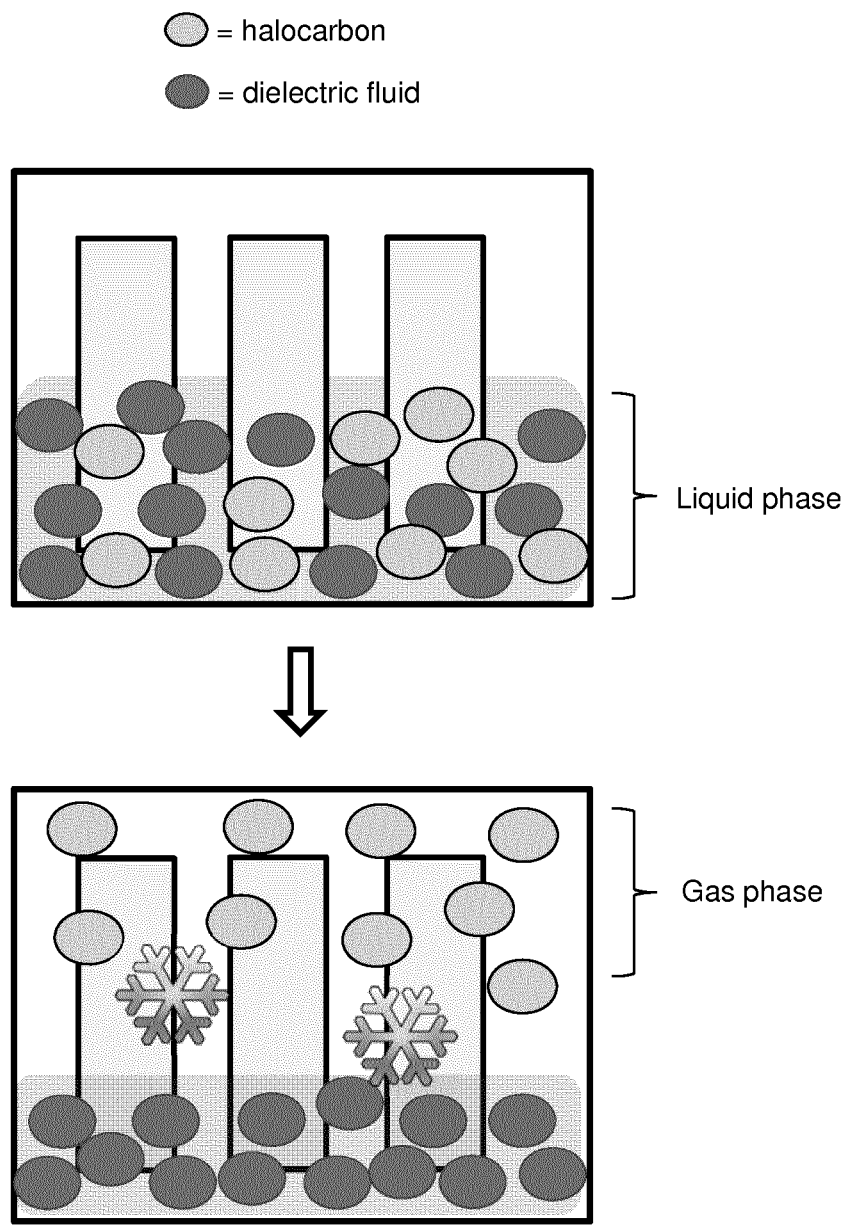
FIG. 5 is a schematic depiction of a cooling operation of a first thermal management fluid of the disclosure.

Such first thermal management fluid utilizes the phase change and chemical inertness properties of certain halocarbon materials with the superior dielectric properties and thermal conductivity of organic dielectric fluids. Specifically, certain halocarbons can undergo a phase change (i.e., liquid to gas) at temperatures relevant to the operation of electrical devices and systems such as lithium-ion batteries. This phase change can be used in a cooling system, with the latent heat of vaporization being used to provide cooling of an electrical component, as schematically shown in FIG. 5. Moreover, many halocarbons have high flash points, or even no flash point at all. Thus, even though the vaporization of halocarbon can create a high concentration of halocarbon vapor in the system, there is little risk of ignition of the vapor. Halocarbons can also generally have advantageously low viscosities and high densities. Many halocarbons, however, have poor thermal conductivity and specific heat capacity. By comparison, dielectric fluids (e.g., organic or silicone) typically have good thermal conductivity and specific heat capacity. The present inventors have determined that vaporization-based cooling as described herein can be advantageously provided by one or more suitable halocarbons dispersed in one or more suitable dielectric fluids. It is the synergistic combination of halocarbon with dielectric fluid that results in the improved first thermal management fluid of the disclosure, with the halocarbon component providing vaporization-based cooling without risk of ignition, and the dielectric fluid component providing desirable heat flow and handling properties, and both fluids providing the dielectric properties necessary for direct cooling of electrical devices and systems. As a result such first thermal management fluids can have a number of advantages over conventional fluids. Notably, vaporization typically requires much more energy than mere temperature increase of a fluid. Accordingly, because the mechanism of cooling can include the vaporization of the halocarbon component of the dielectric thermal management fluid, the first thermal management fluids can have a high overall capacity for cooling. And because a halocarbon component can be selected with a desired boiling point, the person of ordinary skill in the art can provide fluids that have high heat capacities at one or more desired temperatures, in order to maintain the temperature of an electrical device or system within a desired operating range. The combination of materials in the dielectric fluids of the disclosure can also, in various embodiments, provide one or more of desirably low viscosity, high heat conductivity, low risk of ignition, high dielectric constant, and faster temperature response.

As described above, the first thermal management fluid of the disclosure comprise one or more dielectric fluids. As used herein, a dielectric fluid is a liquid at 25° C. and has a dielectric constant of at least 1.5 at 25° C. Dielectric fluids especially desirable for use herein desirably have relatively high thermal conductivity (e.g., at least 0.05 W/m·K, or at least 0.1 W/m·K, or even at least 0.12 W/m·K at 25° C.) and/or relatively high specific heat capacity (e.g., at least 1 J/g·K, or at least 1.2 J/g·K, or even at least 1.5 J/g·K at 25° C.). Various dielectric fluids known in the art can suitably be used in the compositions, systems and methods described herein. In certain desirable embodiments, the one or more dielectric fluids are non-reactive or otherwise inert with respect to components of a battery such as of a lithium-ion battery.

A wide variety of dielectric fluids can be used in the compositions, systems and methods described herein. For example, in certain embodiments as otherwise described herein, the one or more dielectric fluids may be selected from aliphatic dielectric fluids (e.g., $C_{14}$-$C_{50}$ alkyls, $C_{14}$-$C_{50}$ alkenyls, $C_{14}$-$C_{50}$ alkynyls, polyolefins such as poly-α-olefin), aliphatic dielectric fluid oxygenates (e.g., ketones, ethers, esters, or amides), aromatic dielectric fluids (e.g., dialkylbenzene such as diethylbenzene, cyclohexylbenzene, 1-alkylnaphthalene, 2-alkylnaphthalene, dibenzyltoluene, and alkylated biphenyl), aromatic dielectric fluid oxygenates (e.g., ketones, ethers, esters, or amides), silicones (e.g., silicone oil and silicate ester), and any combination thereof.

In certain embodiments as otherwise described herein, the dielectric fluid may be diesel formulated to a high flash point and optionally low sulfur content (e.g., less than 3000 ppm, less than 3000 ppm, or less than 1000 ppm).

In certain embodiments as otherwise described herein, each of the one or more dielectric fluids is an oil, e.g., a mineral oil, a synthetic oil, or a silicone oil. For example, in certain embodiments, the dielectric fluid is a low-viscosity Group III or IV base oil as defined by the American Petroleum Institute (API Publication 1509). Group III base oils (such as hydrocracked and hydroprocessed base oils as well as synthetic oils such as hydrocarbon oils, polyalphaolefins, alkyl aromatics, and synthetic esters) and Group IV base oils (such as polyalphaolefins (PAO)) are wells known base oils. Oils suitable for use as transformer oils can, in many embodiments, be suitable for use as dielectric fluids in the compositions, systems and methods of the disclosure.

Commercially available dielectric fluids include Perfecto™ TR UN (available from Castrol Industrial, United Kingdom) and MIDEL 7131 (available from M&I Materials Ltd., United Kingdom). Commercially available base oils include YUBASE 3 and YUBASE 4 (available from SK Lubricants Co. Ltd., South Korea), DURASYN® 162 and DURASYN® 164 (available from INEOS Oligomers, Houston, Texas), and PRIOLUBE™ oils (available from CRODA, United Kingdom).

Based on the disclosure herein, the one or more dielectric fluids can be selected to provide the first thermal management fluids of the disclosure with a desirable overall heat capacity and thermal conductivity. Moreover, the one or more dielectric fluids can be selected to have low reactivity with respect to the other components of the systems in which they are used, and to provide the first thermal management fluid with a desired viscosity. Other considerations when selecting the one or more dielectric fluids may include their dielectric constant, toxicity, environmental impact and cost.

In certain embodiments as otherwise described herein, the one or more dielectric fluids is present in the first thermal management fluid in a total amount in the range of 65 wt % to 99.9 wt %, based on the total weight of the first thermal management fluid. For example, in certain embodiments of the first thermal management fluid as otherwise described herein, the one or more dielectric fluids is present in a total amount of 70 wt % to 99.9 wt %, or 75 wt % to 99.9 wt %, or 80 wt % to 99.9 wt %, or 85 wt % to 99.9 wt %, or 90 wt % to 99.9 wt %, or 95 wt % to 99.9 wt %, or 65 wt % to 99 wt %, or 70 wt % to 99 wt %, or 75 wt % to 99 wt %, or 80 wt % to 99 wt %, or 85 wt % to 99 wt %, or 90 wt % to 99 wt %, or 95 wt % to 99 wt %, based on the total weight of the first thermal management fluid. In certain embodiments of the first thermal management fluid as otherwise described herein, the one or more dielectric fluids is present in a total amount of 65 wt % to 98 wt %, e.g., 70 wt % to 99 wt %, or 75 wt % to 98 wt %, or 80 wt % to 98 wt %, or 85 wt % to 98 wt %, or 90 wt % to 98 wt %, or 95 wt % to 98 wt %, or 65 wt % to 95 wt %, or 70 wt % to 95 wt %, or 75 wt % to 95 wt %, or 80 wt % to 95 wt %, or 85 wt % to 95 wt %, or 90 wt % to 95 wt %, based on the total weight of the first thermal management fluid. In certain embodiments of the first thermal management fluid as otherwise described herein, the one or more dielectric fluids is present in a total amount of 65 wt % to 90 wt %, e.g., 70 wt % to 90 wt %, or 75 wt % to 90 wt %, or 80 wt % to 90 wt %, or 85 wt % to 90 wt %, or 65 wt % to 85 wt %, or 70 wt % to 85 wt %, or 75 wt % to 85 wt %, or 80 wt % to 85 wt %, or 65 wt % to 80 wt %, or 70 wt % to 80 wt %, or 75 wt % to 80 wt %, based on the total weight of the first thermal management fluid. The total amount of the one or more dielectric fluids can be selected in view of the disclosure herein based, for example, on the total amount of halocarbon(s) necessary to provide the desired cooling behavior, and on the amount of other additives necessary to provide desirable properties to the first thermal management fluid.

As described above, the first thermal management fluids of the disclosure include one or more halocarbons. As used herein, a "halocarbon" is an organic compound that includes one or more of fluorine, chlorine, bromine and iodine. The halocarbons of the disclosure may be partially halogenated compounds (i.e., in which there are one or more C-halogen bonds but also one or more C—H bonds in the structure of the compound) or fully halogenated compounds (i.e., in which there are C-halogen bonds and no C—H bonds in the compound, such as in perfluorinated compounds).

Each of the one or more halocarbons has a boiling point (i.e. at 1 atm) in the range of 30° C. to 150° C. The inventors have noted that relatively volatile halocarbons like those described here can provide a cooling effect when they vaporize from liquid to gas (i.e., as measured by their heats of vaporization) This phase transition will occur in a very narrow temperature range, and thus can serve to provide the first thermal management fluid with the ability to absorb a relatively large amount of heat at a given temperature (i.e., near the boiling point of the halocarbon, in some embodiments modified by the pressure within the space in which the first thermal management fluid is contained). Thus, the use of one or more halocarbons as provided herein can help to prevent thermal runaway of an electrical component by absorbing a relatively high amount of heat at one or more temperatures. Similarly, the use of one or more halocarbons as provided herein can help to quickly absorb heat evolved in a fast charging of an electrical component such as a rechargeable battery (e.g., a lithium-ion battery).

Notably, the pressure of the space in which the one or more halocarbons is contained can be regulated to provide desirable boiling point(s) for the one or more halocarbons. As the person of ordinary skill in the art will appreciate, the boiling point of a material depends on the pressure, so by regulating the pressure, the boiling point can be modified. The pressure can be regulated, for example, to be greater than atmospheric pressure to reduce the boiling point of a halocarbon. The expansion chambers described herein can be used to regulate pressure in the halocarbon-containing space.

The identity (and thus the boiling point) of each of the one or more halocarbons can be selected based on desired operating temperatures of the particular system or process under consideration. Thus, in certain embodiments as otherwise described herein, each of the one or more halocarbons has a boiling point in the range of 30° C. to 100° C., or 30° C. to 90° C., or 30° C. to 85° C., or 30° C. to 80° C., or 30° C. to 75° C., or 30° C. to 70° C. In certain embodiments as otherwise described herein, each of the one or more halocarbons has a boiling point in the range of 40° C. to 150° C., e.g., 50° C. to 150° C., or 60° C. to 150° C., or 70° C. to 150° C., or 80° C. to 150° C., or 90° C. to 150° C., or 100° C. to 150° C., or 110° C. to 150° C., or 30° C. to 100° C., or 40° C. to 100° C., or 50° C. to 100° C., or 60° C. to 100° C., or 70° C. to 100° C., or 80° C. to 100° C., or 30° C. to 90° C., or 40° C. to 90° C., or 50° C. to 90° C., or 60° C. to 90° C., or 30° C. to 85° C., or 40° C. to 85° C., or 45° C. to 85° C., or 50° C. to 85° C., or 60° C. to 85° C., or 30° C. to 80° C., or 40° C. to 80° C., or 45° C. to 80° C., or 50° C. to 80° C., or 60° C. to 80° C., or 30° C. to 75° C., or 40° C. to 75° C., or 45° C. to 75° C., or 50° C. to 75° C., or 60° C. to 75° C., or 30° C. to 70° C., or 40° C. to 70° C., or 45° C. to 70° C., or 50° C. to 70° C., or 60° C. to 70° C., or 65° C. to 75° C.

In certain embodiments as otherwise described herein, a first thermal management fluid of the disclosure includes only a single halocarbon having a boiling point in the range of 30-150° C. This can provide the first thermal management fluid with a single narrow temperature range over which heat can be absorbed through vaporization. However, the present inventors have noted that it can in some embodiments be preferable to provide the first thermal management with two or more different halocarbons. The halocarbons can, in certain embodiments, have substantially different boiling points (e.g., at least 10° C. difference in boiling points, or at least 20° C. difference in boiling points, or even at least 50° C. difference in boiling points). This can allow for two or more separate temperatures at which vaporization can be used to absorb heat. For example, in certain embodiments, the first thermal management fluid as otherwise described herein includes a first halocarbon having a boiling point in the range of 30° C. to 80° C. and a second halocarbon having a boiling point in the range of 80° C. to 150° C. In certain embodiments, the first thermal management fluid as otherwise described herein includes a first halocarbon having a boiling point in the range of 30° C. to 50° C. and a second halocarbon having a boiling point in the range of 80° C. to 110° C.

However, in other embodiments, two halocarbons in a first thermal management fluid can have relatively similar boiling points (e.g., no more than 5° C. difference in boiling points, or no more than 2° C. difference in boiling points, or no more than 1° C. difference in boiling points). In such cases, the two halocarbons may not provide a difference in vaporization temperature, but instead allow the tuning of other physical properties of the overall first thermal management fluid.

When two or more halocarbons are used in a first thermal management fluid, the relative amounts of the two can be varied based on the disclosure herein, depending on the effect desired. In certain embodiments, the mass ratio of a first halocarbon to a second halocarbon is in the range of 1:9 to 9:1.

A variety of halocarbons can be used in the first thermal management fluids of the disclosure. In certain embodiments as otherwise described herein, each of the one or more halocarbons includes as its halogen(s) one or more or chlorine, fluorine and bromine. In certain embodiments as otherwise described herein, each of the one or more halocarbons may be selected from a fluorocarbon, chlorocarbon, and chlorofluorocarbon. For example, suitable fluorocarbons include, but are not limited to, fluoroalkanes and oxygenates thereof (such as perfluoropentane, perfluorohexane, perfluoroheptane, perfluorocyclohexane, perfluoromethylcyclohexane, 2H,3H-perfluoropentane, perfluoro(2-methyl-3-pentanone, methyl nonafluorobutyl ether, ethyl nonafluorobutyl ether, methoxy-nonafluorobutane, ethoxy-nonafluorobutane, tetradecafluoro-2-methylhexan-3-one, and tetradecafluoro-2,4-dimethylpentan-3-one), 3-methoxyperfluoro(2-methylpentane), 3-ethoxyperfluoro (2-methylpentane) fluoroalkenes and oxygenate thereof (such as perfluorohexene), and fluoroaromatic compounds (such as perfluorobenzene). Suitable chlorocarbons include, but are not limited to, chloroalkanes and oxygenates thereof (such as dichloromethane, chloroform, and 1,1,1-trichloroethane), chloroalkene and oxygenate thereof (such as trans-1,2-dichloroethylene and cis-1,2-dichloroethylene), and chloroaromatic compounds.

For example, in certain embodiments, each of the one or more halocarbons of a first thermal management fluid as otherwise described herein is a fluorocarbon. In certain embodiments, the first thermal management fluid as otherwise described herein is wherein the one or more halocarbons includes a fluorocarbon and a chlorocarbon (such as dichloromethane).

Some suitable commercially available halocarbons include those sold under the trade name NOVEC™ (e.g., Novec 7000, 71DA, 71DE, 72DA, 72DE, 72FL, 73DE, 649, 711PA, 7100, 7100DL, 774, 7200, 8200, 7300, 7300DL, 7500, and 7700) available from 3M, Saint Paul, Minnesota.

Based on the disclosure herein, the one or more halocarbons can be selected to have boiling point(s) relevant to the thermal process or system of interest. For example, the each halocarbon can be selected to provide a thermal "stop" to the process or system, helping to maintain temperature around the boiling point thereof even as more heat is absorbed by the first thermal management fluid. When multiple halocarbons are provided, one can provide a thermal "stop" in a desired operation temperature range (e.g., 30-50° C. or 30-80° C., as described above), and another can provide a thermal stop at a higher temperature (e.g., 80-150° C. or 80-110° C., as described above) to prevent thermal runaway. Moreover, the one or more halocarbons can be selected to have low reactivity with respect to the other components of the systems in which they are used, as well as to provide the overall first thermal management fluid with a desired heat capacity, thermal conductivity, and viscosity. Other considerations when selecting the one or more halocarbons may include toxicity and environmental impact.

The one or more halocarbons can be present in the first thermal management fluids described herein in a variety of amounts. In certain embodiments as otherwise described herein, the one or more halocarbons is present in a total amount in the range of 0.1 wt % to 35 wt %, based on the total weight of the first thermal management fluid. For example, in certain embodiments of the first thermal management fluid as otherwise described herein, the one or more halocarbons are present in a total amount of 0.1 wt % to 30 wt %, or 0.1 wt % to 25 wt %, or 0.1 wt % to 20 wt %, or 0.1 wt % to 15 wt %, or 0.1 wt % to 10 wt %, or 0.1 wt % to 5 wt %, or 0.1 wt % to 1 wt %, or 0.5 wt % to 35 wt %, or 0.5 wt % to 30 wt %, or 0.5 wt % to 25 wt %, or 0.5 wt % to 20 wt %, or 0.5 wt % to 15 wt %, or 0.5 wt % to 10 wt %, or 0.5 wt % to 5 wt %, based on the total weight of the first thermal management fluid. In certain embodiments of the first thermal management fluid as otherwise described herein, the one or more halocarbons are present in a total amount of 1 wt % to 35 wt %, e.g., 1 wt % to 30 wt %, or 1 wt % to 25 wt %, or 1 wt % to 20 wt %, or 1 wt % to 15 wt %, or 1 wt % to 10 wt %, or 1 wt % to 5 wt %, based on the total weight of the first thermal management fluid. In certain embodiments of the first thermal management fluid as otherwise described herein, the one or more halocarbons are present in a total amount of 2 wt % to 35 wt %, e.g., 2 wt % to 30 wt %, or 2 wt % to 25 wt %, or 2 wt % to 20 wt %, or 2 wt % to 15 wt %, or 2 wt % to 10 wt %, or 2 wt % to 5 wt %, based on the total weight of the first thermal management fluid. In certain embodiments of the first thermal management fluid as otherwise described herein, the one or more halocarbons is present in a total amount of 5 wt % to 35 wt %, or 5 wt % to 30 wt %, or 5 wt % to 25 wt %, or 5 wt % to 20 wt %, or 5 wt % to 15 wt %, or 5 wt % to 10 wt %, based on the total weight of the first thermal management fluid. In certain embodiments of the first thermal management fluid as otherwise described herein, the one or more halocarbons is present in a total amount of 10 wt % to 35 wt %, or 10 wt % to 30 wt %, or 10 wt % to 25 wt %, or 10 wt % to 20 wt %, or 10 wt % to 15 wt %, or 15 wt % to 35 wt %, or 15 wt % to 30 wt %, or 15 wt % to 25 wt %, or 15 wt % to 20 wt %, or 20 wt % to 35 wt %, or 20 wt % to 30 wt %, or 20 wt % to 25 wt %, based on the total weight of the first thermal management fluid. The person of ordinary skill in the art will provide the halocarbon(s) in an amount to provide a desired degree of heat absorption near the boiling point(s) thereof.

Throughout this specification the term "homogeneously dispersed" means that the one or more halocarbons may be present as small particles (e.g. droplets up to 10 μm, up to 50 μm, or even up to 100 μm in diameter) that are evenly (or homogeneously) mixed throughout the first thermal management fluid, or that the one or more halocarbons is essentially dissolved in the first thermal management fluid. It is understood that the one or more halocarbons can be homogenously dispersed yet leave a minor residue undispersed, but this will be a very small amount, i.e., less than 1%, or 0.5%, or even 0.1% by weight of the halocarbon material.

As the person of ordinary skill in the art will appreciate based, the first thermal management fluids of the disclosure can also include a variety of other components, such as those conventional in compositions for thermal management applications. Examples include, but are not limited to corrosion inhibitors, anti-oxidants (such as phenolic and aminic anti-oxidants), pour point depressants, antifoams, defoamers, viscosity index modifiers, preservatives, biocides, surfactants, seal swell additives, and combinations thereof. In certain embodiments, corrosion inhibitors, anti-oxidants (such as phenolic and aminic anti-oxidants), pour point depressants, antifoams, defoamers, viscosity index modifiers, preservatives, biocides, surfactants, seal swell additives, and combinations thereof, for example, may be present in an amount up to 5.0 wt %, based on the total weight of the first thermal management fluid. In certain such embodiments, one or more of corrosion inhibitors, anti-oxidants (such as phenolic and aminic anti-oxidants), pour point depressants, antifoams, defoamers, viscosity index modifiers, preservatives, biocides, surfactants, seal swell additives, and combinations thereof are present in an amount in the range of 0.1 wt % to 5.0 wt %, or 1.0 wt % to 2.0 wt %, or 0.1 wt % to 1.0 wt %, or 0.1 wt % to 0.5 wt %, or 0.05 wt % to 0.1 wt %, based on the total weight of the first thermal management fluid.

The person of ordinary skill in the art will appreciate that a variety of other components can be present in the first thermal management fluids of the disclosure. However, the present inventors have determined that materials that are substantially dielectric fluid in combination with halocarbon can provide the desirable activities and benefits as described herein. Thus, in certain desirable embodiments, the total amount of the one or more dielectric fluids and the one or more halocarbons is at least 80 wt % of the total weight of the first thermal management fluid. In certain such embodiments, at least 85 wt %, at least 90 wt %, at least 95%, at least 98 wt %, or even at least 99 wt %, of the total weight of the first thermal management fluid is made up of the one or more dielectric fluids and the one or more halocarbons. In certain embodiments as otherwise described herein, thermal management fluids of the disclosure are substantially free or free of other components and essentially only comprise or consist of the one or more dielectric fluids and the one or more halocarbons.

Because there is always a risk that oxygen might enter the system, the first thermal management fluids of the disclosure advantageously have a high flash point to prevent ignition. The present inventors have noted that halocarbons can have high, or in some cases, even no flash point. Accordingly, in desirable embodiments, the vaporization the halocarbons does not pose a substantial ignition hazard, as they are not likely to ignite during operating conditions. The other components of the In certain embodiments, the flash point of the first thermal management fluid of the disclosure above the boiling point of the one or more halocarbons, as measured in accordance with ASTM D56 ("Standard Test Method for Flash Point by Tag Closed Cup Tester"). For example, in certain embodiments, the first thermal management fluid of the disclosure may have no measurable flash point, or a flash point of at least 90° C., e.g., at least 95° C., or at least 100° C., or at least 110° C., or at least 150° C., or even at least 200° C., measured in accordance with ASTM D56. Similarly, each of the one or more halocarbons can be selected so as to have no measurable flash point, or a flash point of at least 90° C., e.g., at least 95° C., or at least 100° C., or at least 110° C., or at least 150° C., or even at least 200° C., measured in accordance with ASTM D56.

The person of ordinary skill in the art will select components to provide the first thermal management fluids with a desired viscosity, e.g., to be conveniently conducted through a system. In certain embodiments of the disclosure, the first thermal management fluids of the disclosure may have a kinematic viscosity at 40° C. of 1.5 to 60 cSt, e.g., 1.5 to 50 cSt, or 1.5 to 40 cSt, or 1.5 to 20 cSt, or 1.5 to 10 cSt, or 3 to 60 cSt, or 3 to 50 cSt, or 3 to 40 cSt, or 3 to 20 cSt, or 5 to 60 cSt, or 5 to 40 cSt, or 5 to 20 cSt, or 10 to 60 cSt, or 10 to 40 cSt, as measured in accordance with ASTM D455.

In certain embodiments of the disclosure, the first thermal management fluid of the disclosure may have a heat capacity of at least 1 J/g·K, or at least 1.2 J/g·K, or even at least 1.5 J/g·K at 25° C. In certain embodiments of the disclosure, the first thermal management fluid of the disclosure may have a heat capacity in the range of 1 J/g·K to 4.5 J/g·K at 25° C. For example, in certain embodiments of the first thermal management fluid as otherwise described herein, the heat capacity in the range of 1 J/g·K to 4 J/g·K, or 1 J/g·K to 3 J/g·K, or 1 J/g·K to 2 J/g K, or 1 J/g·K to 1.5 J/g·K, or 1.5 J/g·K to 4 J/g·K, or 1.5 J/g·K to 3.5 J/g·K, or 1.5 J/g·K to 3 J/g·K, or 1.5 J/g·K to 2 J/g·K, or 2 J/g·K to 4 J/g·K, or 2 J/g·K to 3.5 J/g·K, or 2 J/g·K to 3 J/g·K, at 25° C. The first thermal management fluids of the disclosure will, of course, absorb heat through simple heating even when not in the neighborhood of a boiling point of a halocarbon thereof; the first thermal management fluids can be provided with a sufficient heat capacity to provide a desired level of cooling at such temperatures.

In certain embodiments of the disclosure, the first thermal management fluid of the disclosure may have a thermal conductivity in the range of 0.05 W/m·K to 1 W/m·K at 40° C. For example, in certain embodiments of the first thermal management fluid as otherwise described herein, the thermal conductivity in the range of 0.05 W/m·K to 0.5 W/m·K, or 0.05 W/m·K to 0.2 W/m·K, 0.10 W/m·K to 1 W/m·K, 0.10 W/m·K to 0.5 W/m·K, or 0.10 W/m·K to 0.2 W/m·K, at 40° C.

The first thermal management fluids of the disclosure are desirably dielectric, so that they can be used in direct cooling applications. Accordingly, they have a dielectric constant of at least 1.5 as measured at 25° C. The dielectric constant may be measured using the coaxial probe method, e.g., using a Keysight N1501A dielectric probe kit. In certain embodiments, a first thermal management fluid of the disclosure has a dielectric constant of at least 1.75, at least 2.0, at least 2.25 as measured at 25° C. In certain embodiments, a thermal management fluid of the disclosure has a dielectric constant of at 1.5 to 10, or 1.8 to 10, or 1.5 to 2.8, or 1.8 to 2.8.

The person of ordinary skill in the art will select an amount of the first thermal management fluid of the disclosure to provide a desired amount of cooling. For example, when the electrical component is a rechargeable battery, the amount of the first thermal management fluid can be, for example, in the range of 0.01-0.2 kg per kWh of battery capacity (e.g., 0.02-0.2 kg, or 0.05-0.2 kg, or 0.1-0.2 kg, or 0.01-0.1 kg, or 0.02-0.1 kg, or 0.05-0.1 kg).

While the halocarbon-containing materials described above are especially desirable, other dielectric thermal management materials can be used instead, especially when used in combination with the phase change material-containing second thermal management fluids described below. Accordingly, in certain alternative embodiments, the first thermal management fluid can be some other dielectric thermal management fluid commonly used in the art. Some examples include, but are not limited to dielectric mineral oils, transformer oils, engineered oils, silicone oils, fluorocarbon oils, or combinations thereof.

The methods and the systems of the disclosure include a second thermal management fluid. In certain embodiments, the second thermal management fluid may be an emulsion including: an aqueous carrier fluid; and a dispersion of micelles within the aqueous carrier fluid, wherein each micelle comprises a solid hydrophobic core particle comprising a phase change material having a melting point in the range of 30° C. to 100° C. and one or more emulsifiers forming a micellar shell around the solid hydrophobic core particle.

Such second thermal management fluids are simple and cost-efficient emulsions with improved dispersion of the phase change material. For example, a major drawback for use of molten paraffin as phase change material coolant is its coalescing, which results in deposition of solid paraffin in the cooling system and eventual blockage of the cooling system. The improved dispersion of the disclosure, for example, reduces the tendency of dispersed phase change material (e.g., paraffin) to coalesce when molten. In addition, the phase change material is formulated into micelles having a very small diameter and a very narrow size distribution that, in turn, allows for the emulsion of the disclosure to have improved viscosity and, as a result, thermal conductivity. The smaller micelle size also allows for a higher concentration of the phase change material in the emulsion and thus improving the heat capacity of the emulsion. The higher number of micelles with small diameter and narrow size distribution results in an increased surface area of the micelles compared, which in turn allows for faster temperature response of the emulsion and improved thermal conductivity. The phase change material absorbs heat through the effect of latent heat of fusion over a desired temperature range.

As the person of ordinary skill in the art will appreciate, a micelle is an aggregate of emulsifier molecules dispersed in a colloid, where particles of a first material are suspended in a second material, creating a two-phase system. Unlike in a solution, the first material is insoluble or immiscible in the second material (i.e., it becomes an emulsion). In an aqueous solution, a micelle forms an aggregate with the hydrophobic tails of the emulsifier molecules facing inwards and the hydrophilic heads of the emulsifier molecules facing outwards. This forms a normal-phase micelle, leading to an oil-in-water phase mixture. An inverse-phase micelle has the inverse structure, where the hydrophilic heads of the emulsifier molecules face inwards and the hydrophobic tails face outwards. This leads to a water-in-oil phase mixture. The packing behavior of the emulsifier molecules may lead to a single layer of emulsifier molecules around the core of the micelle, which, following surface energy considerations, may typically form a sphere. Thus, in certain embodiments, the micelles of the disclosure are generally spherical in structure. In the present embodiments an oil-in-water system is envisaged, since the phase change material is a solid oily (waxy) material.

Further layers of emulsifier may also be packed around the outside of the micelle. This will be the case when further emulsifier is added to the mixture. For example, when shear forces are applied to the phase change material, the molecules of the phase change material stretch. This stretching causes the molecules to flatten out and form a laminar structure, thus increasing the surface area any emulsifier has available to be attracted to. Coupled with a laminar flow around the molecule of a dispersion of emulsifier in water, the packing fraction of the emulsifier increases from ≤⅓ to >½. Once the shear force is removed from the molecule, it forms a spherical micelle due to surface energy considerations, unless, of course, the structure of the emulsifier causes the minimum surface energy configuration of a micelle to be laminar or cylindrical. For example, Gemini emulsifiers, sometimes known as dimeric emulsifiers, have two hydrophobic tails that distort the core of the micelle into an elongated ovoid shape. The emulsifier packing fraction then reduces back to ≤⅓ for spherical micelles, so any emulsifier that had been attracted to the temporary laminar configuration of the molecule forms additional layers of emulsifier around the micelle. Only odd numbers of layers form, however, because for a normal-phase micelle the even layers of emulsifier molecules are arranged with the hydrophilic heads in contact with the hydrophilic heads of the first layer of emulsifier molecules, and the hydrophobic tails pointing outwards. The inverse is true for an inverse-phase micelle. Therefore, in both cases, a micelle will have 1, 3, 5, 7 . . . n=2k+1 layers of emulsifier. This also results in effectively no free emulsifier in any form within the emulsion as emulsifier will be bound within these micelles, in multiple layers. As noted above, there is substantially no unbound emulsifier present in the aqueous solution. The more emulsifier added into the emulsion—the greater the number of layers of emulsifier in the micelle. Thus, in certain embodiment, the emulsifier molecules are disposed around a hydrophobic core in a single molecular layer. In certain other embodiments, the emulsifier molecules are disposed around a hydrophobic core in three or more molecular layers. In certain embodiments, different molecular layers may comprise two or more emulsifiers. For example, a non-ionic emulsifier may be present within the surface layers, and ionic emulsifiers may be present within the layer.

In certain embodiments of the second thermal management fluid, the micelles in the emulsion may have uniform size. Thus, in certain embodiments, the distribution of the average diameters of the micelles follows a Gaussian profile. The average micelle diameter is an average of various diameter measurements taken for a micelle, which in the case of spherical micelles is approximately equal to the micelle diameter (since there is little or no variation of the diameter regardless of where the measurement is taken).

In certain embodiments of the second thermal management fluid, the micelles may have a relatively narrow micellar particle size distribution. As the person of ordinary skill in the art will appreciate, the micellar size distribution can be characterized by d50, d10 and d90 values, where d50 is the median particle size, d10 is the particle size at the $10^{th}$ percentile of particles ranked by size, and d90 is the particle size at the $90^{th}$ percentile of particles ranked by size. In certain embodiments, the micelles as otherwise described herein have a d50 value in the range of 0.1 µm to 1.5 µm; e.g., 0.1 µm to 1.2 µm, or 0.1 µm to 1.0 µm, or 0.1 µm to 0.5 µm, or 0.1 µm to 0.4 µm, or 0.2 µm to 1 µm, or 0.2 µm to 0.8 µm, or 0.2 µm to 0.6 µm, or 0.2 µm to 0.5 µm, or 0.2 µm to 0.4 µm, or 0.4 µm to 1 µm, or 0.4 µm to 0.8 µm, or 0.4 µm to 0.6 µm, or 0.4 µm to 0.5 µm, or 0.3 µm to 0.5 µm, or 0.35 µm to 0.45 µm. In certain embodiments, d10 is no less than 50% of d50 and d90 is no more than 150% of d50. In certain embodiments, d10 is no less than 60% of d50 and d90 is no more than 140% of d50. In certain embodiments, d10 is no less than 70% of d50 and d90 is no more than 130% of d50. In certain embodiments, d10 is no less than 75% of d50 and d90 is no more than 125% of d50. In certain embodiments, d10 is no less than 80% of d50 and d90 is no more than 120% of d50.

In certain embodiments, the micelles have a mean diameter of no more than 1.5 µm; e.g., a mean diameter in the range of 0.1 µm to 1.5 µm; e.g., 0.1 µm to 1.2 µm, or 0.1 µm to 1.0 µm, or 0.1 µm to 0.5 µm, or 0.1 µm to 0.4 µm, or 0.2 µm to 1 µm, or 0.2 µm to 0.8 µm, or 0.2 µm to 0.6 µm, or 0.2 µm to 0.5 µm, or 0.2 µm to 0.4 µm, or 0.4 µm to 1 µm, or 0.4 µm to 0.8 µm, or 0.4 µm to 0.6 µm, or 0.4 µm to 0.5 µm, or 0.3 µm to 0.5 µm, or 0.35 µm to 0.45 µm. In certain embodiments, a particularly preferred mean diameter is in the range of 0.1 µm to 1.0 µm.

While there are a number of suitable measurement techniques to determine both the micellar particle size and the micellar particle size distribution, for quantification for purposes of this disclosure, laser particle size analysis using a Beckman Coulter Laser Diffraction PS Analyzer (LS 13 320) is used. This method employs Fraunhoffer diffraction and Polarization Intensity Differential Scanning (PIDS) to determine particle size.

As described above, the micelles of the disclosure comprise a phase change material. As used herein, a phase change material is materials with a high heat of fusion (e.g., more than 100 kJ/kg, or more than 150 kJ/kg, or even more than 200 kJ/kg) that, when melting and solidifying at certain temperatures, are capable of storing and releasing energy. Various phase change materials known in the art can suitably be used in the practice of the invention. Desirably, the phase change materials suitable for use the micelles of the disclosure will be thermally cyclable, non-hazardous or non-toxic, and non-reactive or otherwise inert with respect to other battery components. In certain embodiments, the phase change material is a waxy, wax-based, or wax-containing material.

The choice of suitable phase change material will depend upon the end application of the fluid of the disclosure. The phase change material may be a fully formulated waxy material or may be a blend of components, wherein at least one component is waxy. In certain embodiments, the phase change materials may be selected from paraffins, microcrystalline waxes, polyethylene waxes, ester waxes, fatty acids, fatty amide-containing materials, sulfonamide materials, resinous materials made from different natural sources (for example, tall oil rosins and rosin esters), synthetic resins, oligomers, polymers and copolymers, and combinations thereof.

In certain embodiments, the phase change material is paraffin. Paraffin wax consists of a mixture of mostly straight chain alkanes having in the range of 14 and 40 carbon atoms. Commercially available paraffin wax may be fully refined grade (i.e., containing less than 0.5% oil), semi refined grade (i.e., containing in the range of 0.5 and 1.5% oil), scale waxes grade (i.e., containing in the range of 0.5% to 5% oil), and slack wax grade (i.e., containing in the range of 5% to 20% oil). One of skill in the art will recognize that choice of suitable paraffin with respect to the size and grade will depend on the desired properties of the emulsion. Some commercial sources include, for example, Parafol and Sasolwax brands of paraffin wax (available from Sasol, Germany), Indrawax brand of paraffin wax (available from Industrial Raw Materials LLC, Plainview, New York), paraffin waxes available from BASF, Germany), and Parvan™ brand of paraffin wax (available from Exxon Mobil Corporation, Irving, Texas).

In certain embodiments, the phase change materials may be selected from 1-cyclohexylooctadecane, 4-heptadacanone, quinone, benzamide, and a mixture thereof. In certain embodiments, the phase change materials may be paraffin in combination with one or more of 1-cyclohexylooctadecane, 4-heptadacanone, quinone, and benzamide.

The choice of the phase change material may also depend on the operating temperatures of the second thermal management applications and devices. Thus, in certain embodiments, the phase-change material has a melting point of at least 30° C.; e.g., at least 35° C., or at least 40° C., or at least 50° C., or at least 60° C., or at least 70° C., or in the range of 30° C. and 100° C., or in the range of 30° C. to 90° C., or in the range of 30° C. to 80° C., or in the range of 30° C. to 75° C., or in the range of 30° C. to 70° C., or in the range of 30° C. to 65° C., or in the range of 30° C. to 60° C., or in the range of 35° C. to 100° C., or in the range of 35° C. to 90° C., or in the range of 35° C. to 80° C., or in the range of 35° C. to 75° C., or in the range of 35° C. to 70° C., or in the range of 35° C. to 65° C., or in the range of 35° C. to 60° C., or in the range of 40° C. to 100° C., or in the range of 40° C. to 90° C., or in the range of 40° C. to 80° C., or in the range of 40° C. to 75° C., or in the range of 40° C. to 70° C., or in the range of 40° C. to 65° C., or in the range of 40° C. to 60° C., or in the range of 50° C. to 100° C., or in the range of 50° C. to 90° C., or in the range of 50° C. to 80° C., or in the range of 50° C. to 75° C., or in the range of 50° C. to 70° C., or in the range of 50° C. to 65° C., or in the range of 50° C. to 60° C.

Notably, the present inventors have determined that, while high-viscosity or solid phase additives such as waxes (e.g., paraffins) are generally difficult to emulsify, they can be successfully and stably emulsified using the methods described herein. In certain embodiments, the emulsion may have an overall viscosity value at 30° C. (in accordance with ASTM D455) of around 3.4 cP, mimicking a 60/40 water/ethylene glycol coolant.

The emulsions of the second thermal management fluid of the disclosure may comprise one phase-change material (i.e., the micelles of the disclosure comprise one phase-change material). The emulsions of the second thermal management fluid of the disclosure may also comprise two or more different phase changing materials. For example, in certain embodiments, the micelles comprise a first set of micelles having solid hydrophobic core particles comprising a first phase change material, and a second set of micelles having solid hydrophobic core particles comprising a second phase change material different from the first phase change material. The first phase change material and the second phase change material may have substantially the same melting point (e.g., no more than 5° C. difference in melting points, or no more than 2° C. difference in melting points, or no more than 1° C. difference in melting points). The first phase change material and the second phase change material may also have different melting points (e.g., at least 10° C. difference in melting points, or at least 20° C. difference in melting points, or at least 50° C. difference in melting points).

The inventors have determined that different paraffins may be selected based on their melting points for use in the second thermal management fluid of the disclosure. For example, the paraffins having melting point most relevant to the end application, such as battery charging, can be used. It is also possible to provide an emulsion comprising a variety of phase change materials, each with a different melting point and/or mass, such that the solid phase change materials enter the liquid phase over a range of temperatures. This results in the emulsion of the second thermal management fluid of the disclosure being able to provide a constant or varying cooling effect as desired.

In certain embodiments of the disclosure, the emulsions of the second thermal management fluid of the disclosure include the phase change materials in an amount within the range of about 10 wt % to about 60 wt %, based on the total weight of the emulsion. For example, in certain embodiments of the emulsion as otherwise described herein, the phase transfer material is present in an amount of about 10 wt % to about 50 wt %, or about 10 wt % to about 30 wt %, or about 10 wt % to about 15 wt %, or about 40 wt % to about 60 wt %, or about 45 wt % to about 55 wt %, or about 50 wt % to about 60 wt %, or about 50 wt % to about 55 wt %. A particularly preferred embodiment employs a wax content of about 53.9 wt %.

As described above, the emulsions of the second thermal management fluid of the disclosure include one or more emulsifiers. The inventors have found that, in certain embodiments, the one or more emulsifiers is substantially bound into the micelle. For example, in certain embodiments, no more than 1 wt % of the one or more emulsifiers is present in the emulsion in an unbound state (i.e., not part of a micelle), based on the total weight of the emulsion. In certain embodiments, no more than 0.5 wt %, or no more than 0.1 wt %, or no more than 0.05 wt %, or even no more than 0.01 wt % is present in the emulsion in an unbound state, based on the total weight of the emulsion. The point at which the emulsion becomes substantially free of excess emulsifier can be determined by measuring the surface tension of the emulsion. Once the critical micelle concentration has been reached, and no more emulsifier molecules are included in the surface layer(s), the surface tension of the emulsion exhibits a discontinuity. This may be detected by surface tension measurement techniques known to those skilled in the art. Other techniques for determining this point include nuclear magnetic resonance (NMR) techniques and optical scattering techniques. These include those taught in James-Smith et al, *Journal of Colloid and Interface Science*, 310: 590-598 (2007).

In certain desirable embodiments as otherwise described herein, the emulsion of the second thermal management fluid is substantially free of defoamers and anti-foam compounds. The present inventors have determined that the emulsification techniques described herein can provide emulsions that are not susceptible to foaming, despite not including substantial amounts of defoamers/anti-foam compounds. For example, in certain embodiments, the emulsion of the disclosure comprises no more than 2 wt % of the one or more one or more defoamers and anti-foam compounds based on the total weight of the emulsion, e.g., no more than 1 wt %, or no more than 0.5 wt %, or no more than 0.1 wt %, or no more than 0.01 wt %, or no more than 0.005 wt %, or even no more than 0.001 wt %.

Typical anti-foam/defoamer compositions used commonly used in metalworking fluids include organo-modified siloxane antifoams, PDMS (polydimethylsiloxane) antifoams, and wax defoamers. Both organo-modified siloxane antifoams and PDMS antifoams are based on a poly-siloxane backbone. In a PDMS antifoam, only methyl groups and oxygen are bonded at the silicon atom. In organo-modified siloxane antifoams, organic side chains (such as copolymers of ethylene-/propylene-oxide are chemically bonded to the polysiloxane backbone. Typical wax defoamers include, but are not limited to, ethylene bis stearamide (EBS), paraffin waxes, ester waxes, and fatty alcohol wax. With each type of anti-foam/defoamer the foam is destroyed by the hydrophobic solid material in the anti-foam/defoamer breaking down the film that forms between the anti-foam/defoamer material and the droplets of foam. In certain embodiments of the second thermal management fluid as otherwise described herein, the emulsion comprises no more than 1 wt % total of organo-modified siloxane antifoams, PDMS (polydimethylsiloxane) antifoams, and wax defoamers, or no more than 2 wt % of the one or more one or more defoamers and anti-foam compounds based on the total weight of the emulsion, e.g., no more than 1 wt %, or no more than 0.5 wt %, or no more than 0.1 wt %, or no more than 0.01 wt %, or no more than 0.005 wt %, or even no more than 0.001 wt %.

Emulsifiers suitable for use in the embodiments of the disclosure include all those that are oil soluble with polar head molecules, including those having the general structure hydrocarbyl group—aryl group—polyether group. A particularly useful wax emulsifier is one comprising a mixture of alkyl and alkylaryl ethoxylates. In certain embodiments, the emulsifiers may include surfactants. The person of ordinary skill in the art will select desirable emulsifiers based on the disclosure herein.

In certain embodiments of the disclosure, the emulsions of the second thermal management fluid of the disclosure include one or more emulsifiers in an amount within the range of about 0.1 wt % to about 10 wt % based on the total weight of the emulsion. For example, in certain embodiments of the emulsion of the second thermal management fluid as otherwise described herein, the one or more emulsifiers is present in an amount of about 0.1 wt % to about 8 wt %, or about 0.1 wt % to about 5 wt %, or about 0.1 wt % to about 2 wt %, or about 0.1 wt % to about 1 wt %, or about 0.2 wt % to about 10 wt %, or about 0.2 wt % to about 8 wt %, or about 0.2 wt % to about 5 wt %, or about 0.2 wt % to about 2 wt %, or about 0.2 wt % to about 1 wt %, or about 0.5 wt % to about 10 wt %, or about 0.5 wt % to about 8 wt %, or about 0.5 wt % to about 5 wt %, or about 0.5 wt % to about 2 wt %, or about 1 wt % to about 10 wt %, or about 1 wt % to about 8 wt %, or about 1 wt % to about 5 wt %, or about 2 wt % to about 10 wt %, or about 2 wt % to about 8 wt %, or about 2 wt % to about 5 wt %, based on the total weight of the emulsion. As the person of ordinary skill in the art will appreciate, the amount of the one or more emulsifiers is directly scalable with the weight % of the phase-change material.

As the person of ordinary skill in the art will appreciate, the ratio of the amount of phase change material to the amount of emulsifier will be a factor that determines the micelle size. In certain embodiments of the second thermal management fluid as otherwise described herein, the weight ratio of the amount of phase change material to the amount of emulsifier is in the range of about 1 to about 10, or about 1 to 8, or about 2 to 10.

An aqueous carrier fluid in certain embodiments of the second thermal management fluid of the disclosure may be water. In certain embodiments, the aqueous carrier fluid may be water and one or more of glycerol, methanol, ethylene glycol, propylene glycol, and diethylene glycol, In certain embodiments, the one or more of glycerol, methanol, ethylene glycol, propylene glycol, and diethylene glycol may be present in an amount of about 1 to 10 wt % based on the total weight of the aqueous carrier fluid.

As the person of ordinary skill in the art will appreciate based, the second thermal management fluids of the disclosure can also include a variety of other components, such as those conventional in compositions for thermal management applications. Examples include, but are not limited to corrosion inhibitors, anti-oxidants (such as phenolic and aminic anti-oxidants), pour point depressants, defoamers, viscosity index modifiers, preservatives, biocides, and combinations thereof. In certain embodiments, corrosion inhibitors, anti-oxidants (such as phenolic and aminic anti-oxidants), pour point depressants, defoamers, viscosity index modifiers, preservatives, biocides, and combinations thereof, for example, may be present in an amount up to 5.0 wt %, based on the total weight of the second thermal management fluid. In certain such embodiments, one or more of corrosion inhibitors, anti-oxidants (such as phenolic and aminic anti-oxidants), pour point depressants, defoamers, viscosity index modifiers, preservatives, biocides, and combinations thereof are present in an amount in the range of 0.1 wt % to 5.0 wt %, or 1.0 wt % to 2.0 wt %, or 0.1 wt % to 1.0 wt %, based on the total weight of the second thermal management fluid.

The person of ordinary skill in the art will appreciate that a variety of other components can be present in the second thermal management fluids of the disclosure.

The person of ordinary skill in the art will select components to provide the second thermal management fluids with a desired viscosity, e.g., to be conveniently conducted through a system. In certain embodiments of the disclosure, the second thermal management fluids of the disclosure may have a kinematic viscosity at 40° C. of 1.5 to 60 cSt, e.g., 1.5 to 50 cSt, or 1.5 to 40 cSt, or 1.5 to 20 cSt, or 1.5 to 10 cSt, or 3 to 60 cSt, or 3 to 50 cSt, or 3 to 40 cSt, or 3 to 20 cSt, or 5 to 60 cSt, or 5 to 40 cSt, or 5 to 20 cSt, or 10 to 60 cSt, or 10 to 40 cSt, as measured in accordance with ASTM D455.

In certain embodiments of the disclosure, the second thermal management fluid of the disclosure may have a heat capacity of at least 1 J/g·K, or at least 1.2 J/g·K, or even at least 1.5 J/g·K at 25° C. In certain embodiments of the disclosure, the second thermal management fluid of the disclosure may have a heat capacity in the range of 1 J/g·K to 4.5 J/g·K at 25° C. For example, in certain embodiments of the second thermal management fluid as otherwise described herein, the heat capacity in the range of 1 J/g·K to 4 J/g·K, or 1 J/g·K to 3 J/g·K, or 1 J/g·K to 2 J/g K, or 1 J/g·K to 1.5 J/g·K, or 1.5 J/g·K to 4 J/g·K, or 1.5 J/g·K to 3.5 J/g·K, or 1.5 J/g·K to 3 J/g·K, or 1.5 J/g·K to 2 J/g·K, or 2 J/g·K to 4 J/g·K, or 2 J/g·K to 3.5 J/g·K, or 2 J/g·K to 3 J/g·K, at 25° C.

In certain embodiments of the disclosure, the second thermal management fluid of the disclosure may have a thermal conductivity in the range of 0.05 W/m·K to 1 W/m·K at 40° C. For example, in certain embodiments of the second thermal management fluid as otherwise described herein, the thermal conductivity in the range of 0.25 W/m·K to 1 W/m·K, or 0.5 W/m·K to 1 W/m·K 0.75 W/m·K to 1 W/m·K, or 0.05 W/m·K to 0.5 W/m·K, at 40° C.

While the phase change material-containing emulsions described above are especially attractive for use the second thermal management fluid, in other embodiments different materials can be used. For example, in certain embodiments, the second thermal management fluid of the disclosure may be as described above with respect to the first thermal management fluid. For example, in certain embodiments, the second thermal management fluid may include one or more dielectric fluids and one or more halocarbons as described above, or the second thermal management fluid may include other dielectric coolants commonly used in the art as described above. In certain other embodiments, the second thermal management fluid may include one or more alkylene glycols. Some preferred alkylene glycols include ethylene glycols, diethylene glycol, propylene glycol, and butylene glycol, which may be used alone or as a mixture. For example, the glycol may be a mixture with water. For example, in certain embodiments, the second thermal management fluid includes or essentially includes one or more glycols and water (e.g., at least 75 wt %, at least 80 wt %, at least 85 wt %, at least 90 wt %, at least 95%, or even at least 98 wt % of the total weight of the second thermal management fluid is made up of the one or more glycols and water).

As noted above, the methods and the systems of the disclosure may also include a third thermal management fluid. In certain embodiments, the third thermal management fluid of the disclosure may be the same as any one of thermal fluids described above with respect to the first thermal management fluid or the second thermal management fluid.

Various exemplary embodiments of the disclosure include, but are not limited to:

Embodiment 1 provides a system comprising:
an electric heat source;
a first heat exchanger having a first portion and a second portion;
a first fluid circuit in substantial thermal contact with the heat source and configured to circulate a first thermal management fluid between the heat source and the first portion of the first heat exchanger, wherein the first fluid circuit is configured such that the first thermal management fluid can absorb heat from the heat source and can dissipate heat in the first heat exchanger; and
a second fluid circuit configured to pass a second thermal management fluid over the second portion of the first heat exchanger and absorb heat therefrom,
wherein
(a) the first thermal management fluid comprises:
one or more dielectric fluids present in a total amount in the range of 65 wt % to 99.9 wt %; and
one or more halocarbons each having a boiling point in the range of 30° C. to 150° C., present in a total amount in the range of 0.1 wt % to 35 wt %,
wherein the one or more halocarbons are homogeneously dispersed in the first thermal management fluid;
wherein the dielectric thermal management fluid has a dielectric constant of at least 1.5 at 25° C.; and
wherein a flash point of the first thermal management fluid is above the boiling point of the one or more halocarbons;
and/or
(b) the second thermal management fluid comprises:
an aqueous carrier fluid; and
a dispersion of micelles within the aqueous carrier fluid, wherein each micelle comprises a solid hydrophobic core particle comprising a phase change material having a melting point in the range of 30° C. to 100° C. and one or more emulsifiers forming a micellar shell around the solid hydrophobic core particle.

Embodiment 2 provides the system of embodiment 1, wherein the first circuit comprises a first pump configured to circulate the first fluid.

Embodiment 3 provides the system of embodiment 1 or 2, wherein the first fluid circuit comprises a first conduit extending around and/or through the heat source to provide the thermal contact with the heat source.

Embodiment 4 provides the system of any of embodiments 1-3, further comprising a second heat exchanger in substantial thermal contact with the second fluid circuit, the second heat exchanger being configured to dissipate heat from the second fluid circuit.

Embodiment 5 provides the system of any of embodiments 1-5, wherein the second circuit comprises a second pump configured to circulate the second thermal management fluid.

Embodiment 6 provides the system of any of embodiments 1-5, wherein the first fluid circuit comprises an expansion chamber configured to receive a vapor from the first thermal management fluid (e.g., from vaporization of a halocarbon component of the first thermal management fluid).

Embodiment 7 provides the system of embodiment 6, further comprising a third heat exchanger having a first portion and a second portion, where the first portion of the third heat exchanger is configured to absorb heat from the expansion chamber and the second portion of the third heat exchanger is configured to dissipate heat from the first portion of the third heat exchanger.

Embodiment 8 provides the system of embodiment 7, wherein the second fluid circuit comprises the second portion of the third heat exchanger, wherein the second portion of the third heat exchanger is configured to receive the second thermal management fluid that can absorb heat from the expansion chamber through the second portion of the third heat exchanger and can dissipate heat in the second heat exchanger.

Embodiment 9 provides the system of embodiment 7, further comprising a third fluid circuit configured to circulate a third thermal management fluid between the second portion of the third heat exchanger and a fourth heat exchanger, wherein the third fluid circuit is configured such that the third thermal management fluid can absorb heat from the expansion chamber through the second portion of the third heat exchanger and can dissipate heat in the fourth heat exchanger.

Embodiment 10 provides the system of embodiment 9, wherein the third thermal management fluid is the same as the first thermal management fluid, or is the same as the second thermal management fluid.

Embodiment 11 provides the system of embodiment 9 or embodiment 10, wherein the third circuit comprises a third pump configured to circulate the third fluid.

Embodiment 12 provides the system of embodiment 11, wherein the electrical heat source is a battery (e.g., a rechargeable battery) including a plurality of electrochemical cells (e.g., rechargeable electrochemical cells such as lithium ion electrochemical cells).

Embodiment 13 provides a method comprising:
circulating a first thermal management fluid in a first fluid circuit and between an electrical heat source and a first portion of a first heat exchanger;
absorbing thermal energy in the first thermal management fluid from the heat source;
dissipating thermal energy from the first thermal management fluid into the first heat exchanger; and circulating a second thermal management fluid in a second fluid circuit and over a second portion of the first heat exchanger; and absorbing heat from the first exchanger into the second thermal management fluid;

wherein (a) the first thermal management fluid comprises:

one or more dielectric fluids present in a total amount in the range of 65 wt % to 99.9 wt %; and one or more halocarbons each having a boiling point in the range of 30° C. to 150° C., present in a total amount in the range of 0.1 wt % to 35 wt %, wherein the one or more halocarbons are homogeneously dispersed in the first thermal management fluid;

wherein the dielectric thermal management fluid has a dielectric constant of at least 1.5 at 25° C.; and wherein a flash point of the first thermal management fluid is above the boiling point of the one or more halocarbons;

and/or (b) the second thermal management fluid comprises:

an aqueous carrier fluid; and a dispersion of micelles within the aqueous carrier fluid, wherein each micelle comprises a solid hydrophobic core particle comprising a phase change material having a melting point in the range of 30° C. to 100° C. and one or more emulsifiers forming a micellar shell around the solid hydrophobic core particle.

Embodiment 14 provides the method of embodiment 13, further comprising absorbing thermal energy in the second thermal management fluid from the first heat exchanger; and dissipating thermal energy from the second thermal management fluid into a second heat exchanger.

Embodiment 15 provides the method of embodiment 13 or 14, further comprising:

receiving a vapor from the first thermal management fluid (e.g., from vaporization of a halocarbon component of the first thermal management fluid) in an expansion chamber of the first circuit.

Embodiment 16 provides the method according to embodiment 15, further comprising absorbing energy into a third heat exchanger from the expansion chamber.

Embodiment 17 provides the method according to embodiment 16, wherein the absorbing of energy from the expansion chamber condenses a vapor of a halocarbon Embodiment 18 provides the method embodiment 16 or 17, further comprising:

circulating the second thermal management fluid in the third heat exchanger to absorb heat energy from the third heat exchanger into the second thermal management fluid.

Embodiment 19 provides the method of embodiment 16 or 17, further comprising:

circulating a third thermal management fluid in a third fluid circuit and absorbing heat energy from the third heat exchanger into the third thermal management fluid.

Embodiment 20 provides the method of embodiment 19, further comprising:

dissipating thermal energy from the third thermal management fluid into a fourth heat exchanger.

Embodiment 21 provides the method of any of embodiments 13-20, wherein the thermal energy from the heat source is absorbed by vaporizing one or more of the halocarbons of the first thermal management fluid.

Embodiment 22 provides the method of any of embodiments 13-21, wherein the electrical heat source includes a battery pack, a capacitor, inverter, electrical cabling, a fuel cell, a motor, or a computer.

Embodiment 23 provides the method or system of any of embodiments 1-22, wherein (a) the first thermal management fluid comprises:

one or more dielectric fluids present in a total amount in the range of 65 wt % to 99.9 wt %; and one or more halocarbons each having a boiling point in the range of 30° C. to 150° C., present in a total amount in the range of 0.1 wt % to 35 wt %, wherein the one or more halocarbons are homogeneously dispersed in the first thermal management fluid;

wherein the dielectric thermal management fluid has a dielectric constant of at least 1.5 at 25° C.; and wherein a flash point of the first thermal management fluid is above the boiling point of the one or more halocarbons.

Embodiment 24 provides the method or system of embodiment 23, wherein each of the one or more dielectric fluids is selected from aliphatic dielectric fluids (e.g., $C_{14}$-$C_{50}$ alkyls, $C_{14}$-$C_{50}$ alkenyls, $C_{14}$-$C_{50}$ alkynyls, polyolefins such as poly-α-olefin), aliphatic dielectric fluid oxygenates (e.g., ketones, ethers, esters, or amides), aromatic dielectric fluids (e.g., dialkylbenzene such as diethylbenzene, cyclohexylbenzene, 1-alkylnaphthalene, 2-alkylnaphthalene, dibenzyltoluene, and alkylated biphenyl), aromatic dielectric fluid oxygenates (e.g., ketones, ethers, esters, or amides), silicones (e.g., silicone oil and silicate ester), and any combination thereof.

Embodiment 25 provides the method or system of embodiment 23 wherein each of the one or more dielectric fluids is selected from $C_{14}$-$C_{50}$ alkyls, polyolefins, and any combination thereof.

Embodiment 26 provides the method or system of embodiment 23, wherein each of the one or more dielectric fluids is a mineral oil or a silicone oil.

Embodiment 27 provides the method or system of any of embodiments 23-26, wherein the one or more dielectric fluids are present in a total amount of 70 wt % to 99.9 wt %, or 75 wt % to 99.9 wt %, or 80 wt % to 99.9 wt %, or 85 wt % to 99.9 wt %, or 90 wt % to 99.9 wt %, or 95 wt % to 99.9 wt %, or 65 wt % to 99 wt %, or 70 wt % to 99 wt %, or 75 wt % to 99 wt %, or 80 wt % to 99 wt %, or 85 wt % to 99 wt %, or 90 wt % to 99 wt %, or 95 wt % to 99 wt %, based on the total weight of the thermal management fluid.

Embodiment 28 provides the method or system of any of embodiments 23-26, wherein the one or more dielectric fluids are present in a total amount of 65 wt % to 98 wt %, e.g., 70 wt % to 99 wt %, or 75 wt % to 98 wt %, or 80 wt % to 98 wt %, or 85 wt % to 98 wt %, or 90 wt % to 98 wt %, or 95 wt % to 98 wt %, or 65 wt % to 95 wt %, or 70 wt % to 95 wt %, or 75 wt % to 95 wt %, or 80 wt % to 95 wt %, or 85 wt % to 95 wt %, or 90 wt % to 95 wt %, based on the total weight of the thermal management fluid.

Embodiment 29 provides the method or system of any of embodiments 23-26, wherein the one or more dielectric fluids are present in a total amount of 65 wt % to 90 wt %, e.g., 70 wt % to 90 wt %, or 75 wt % to 90 wt %, or 80 wt % to 90 wt %, or 85 wt % to 90 wt %, or 65 wt % to 85 wt %, or 70 wt % to 85 wt %, or 75 wt % to 85 wt %, or 80 wt % to 85 wt %, or 65 wt % to 80 wt %, or 70 wt % to 80 wt %, or 75 wt % to 80 wt %, based on the total weight of the thermal management fluid.

Embodiment 30 provides the method or system of any of embodiments 23-29, wherein each of the one or more halocarbons has a boiling point in the range of 30° C. to 100° C., or 30° C. to 90° C., or 30° C. to 85° C., or 30° C. to 80° C., or 30° C. to 75° C., or 30° C. to 70° C.

Embodiment 31 provides the method or system of any of embodiments 23-29, wherein each of the one or more halocarbons has a boiling point in the range of 40° C. to 150° C., e.g., 50° C. to 150° C., or 60° C. to 150° C., or 70° C. to 150° C., or 80° C. to 150° C., or 90° C. to 150° C., or 100° C. to 150° C., or 110° C. to 150° C., or 40° C. to 100° C., or 50° C. to 100° C., or 60° C. to 100° C., or 70° C. to 100° C., or 80° C. to 100° C., or 40° C. to 90° C., or 50° C. to 90° C., or 60° C. to 90° C., or 40° C. to 85° C., or 45° C. to 85° C., or 50° C. to 85° C., or 60° C. to 85° C., or 40° C. to 80° C., or 45° C. to 80° C., or 50° C. to 80° C., or 60° C. to 80° C., or 40° C. to 75° C., or 45° C. to 75° C., or 50° C. to 75° C., or 60° C. to 75° C., or 40° C. to 70° C., or 45° C. to 70° C., or 50° C. to 70° C., or 60° C. to 70° C., or 65° C. to 75° C.

Embodiment 32 provides the method or system of any of embodiments 23-29, wherein the one or more halocarbons comprises a first halocarbon having a boiling point in the range of 30° C. to 50° C. and a second halocarbon having a boiling point in the range of 80° C. to 110° C.

Embodiment 33 provides the method or system of any of embodiments 23-32, wherein each of the one or more halocarbons includes as its halogen(s) one or more or chlorine, fluorine and bromine.

Embodiment 34 provides the method or system of any of embodiments 23-32, wherein each of the one or more halocarbons is selected from fluorocarbon, chlorocarbon, and chlorofluorocarbon.

Embodiment 35 provides the method or system of any of embodiments 23-32, wherein the one or more halocarbons include a fluorocarbon and a chlorocarbon (such as dichloromethane).

Embodiment 36 provides the method or system of any of embodiments 23-35, wherein at least one of the one or more halocarbons is a chlorocarbon selected from chloroalkanes and oxygenates thereof (such as dichloromethane, chloroform, and 1,1,1-trichloroethane), chloroalkene and oxygenate thereof (such as trans-1,2-dichloroethylene and cis-1,2-dichloroethylene), and chloroaromatic compounds.

Embodiment 37 provides the method or system of any of embodiments 23-32, wherein each of the one or more halocarbons is a fluorocarbon.

Embodiment 38 provides the method or system of any of embodiments 23-37, wherein at least one of the one or more halocarbons is a fluorocarbon selected from fluoroalkanes and oxygenates thereof (such as perfluoropentane, perfluorohexane, perfluoroheptane, perfluorocyclohexane, perfluoromethylcyclohexane, 2H,3H-perfluoropentane, perfluoro(2-methyl-3-pentanone), methyl nonafluorobutyl ether, ethyl nonafluorobutyl ether, methoxy-nonafluorobutane, ethoxy-nonafluorobutane, tetradecafluoro-2-methylhexan-3-one, and tetradecafluoro-2,4-dimethylpentan-3-one), 3-methoxyperfluoro(2-methylpentane), 3-ethoxyperfluoro(2-methylpentane) fluoroalkenes and oxygenate thereof (such as perfluorohexene), and fluoroaromatic compounds (such as perfluorobenzene).

Embodiment 39 provides the method or system of any of embodiments 23-39, wherein each of the one or more halocarbons has no measureable flash point, or a flash point of at least 90° C., e.g., at least 95° C., or at least 100° C., or at least 110° C., or at least 150° C., or even at least 200° C., measured in accordance with ASTM D56.

Embodiment 40 provides the method or system of any of embodiments 23-39, wherein the one or more halocarbons are present in a total amount of 0.1 wt % to 30 wt %, or 0.1 wt % to 25 wt %, or 0.1 wt % to 20 wt %, or 0.1 wt % to 15 wt %, or 0.1 wt % to 10 wt %, or 0.1 wt % to 5 wt %, or 0.1 wt % to 1 wt %, based on the weight of the thermal management fluid.

Embodiment 41 provides the method or system of any of embodiments 23-39, wherein the one or more halocarbons are present in a total amount of 1 wt % to 35 wt %, or 1 wt % to 30 wt %, or 1 wt % to 25 wt %, or 1 wt % to 20 wt %, or 1 wt % to 15 wt %, or 1 wt % to 10 wt %, or 1 wt % to 5 wt %, based on the total weight of the thermal management fluid.

Embodiment 42 provides the method or system of any of embodiments 23-39, wherein the one or more halocarbons are present in a total amount of 2 wt % to 35 wt %, or 2 wt % to 30 wt %, or 2 wt % to 25 wt %, or 2 wt % to 20 wt %, or 2 wt % to 15 wt %, or 2 wt % to 10 wt %, or 2 wt % to 5 wt %, based on the total weight of the thermal management fluid.

Embodiment 43 provides the method or system of any of embodiments 23-39, wherein the one or more halocarbons are present in a total amount of 5 wt % to 35 wt %, or 5 wt % to 30 wt %, or 5 wt % to 25 wt %, or 5 wt % to 20 wt %, or 5 wt % to 15 wt %, or 5 wt % to 10 wt %, based on the total weight of the thermal management fluid Embodiment 44 provides the method or system of any of embodiments 23-39, wherein the one or more halocarbons are present in a total amount of 10 wt % to 35 wt %, or 10 wt % to 30 wt %, or 10 wt % to 25 wt %, or 10 wt % to 20 wt %, or 10 wt % to 15 wt %, or 15 wt % to 35 wt %, or 15 wt % to 30 wt %, or 15 wt % to 25 wt %, or 15 wt % to 20 wt %, or 20 wt % to 35 wt %, or 20 wt % to 30 wt %, or 20 wt % to 25 wt %, based on the total weight of the thermal management fluid.

Embodiment 45 provides the method or system of any of embodiments 23-44, wherein (a) the first thermal management fluid further comprising corrosion inhibitors, anti-oxidants (such as phenolic and aminic anti-oxidants), pour point depressants, antifoams, defoamers, viscosity index modifiers, preservatives, biocides, surfactants, seal swell additives, and combinations thereof, e.g., in an amount up to 0.5 wt %, up to 1.0 wt %, or up to 5.0 wt %.

Embodiment 46 provides the method or system of any of embodiments 23-45, wherein the total amount of the one or more dielectric fluids and the one or more halocarbons in the thermal management fluid is at least 80%, e.g., at least 85%.

Embodiment 47 provides the method or system of any of embodiments 23-45, wherein the total amount of the one or more dielectric fluids and the one or more halocarbons in the thermal management fluid is at least 90%, at least 95%, or at least 98%.

Embodiment 48 provides the method or system of any of embodiments 1-22, wherein the first thermal management fluid comprises one or more dielectric fluids selected from mineral oil, transformer oil, engineered oil, silicone oil, and fluorocarbon oil.

Embodiment 49 provides the method or system of any of embodiments 1-48, wherein (b) the second thermal management fluid comprises:
an aqueous carrier fluid; and
a dispersion of micelles within the aqueous carrier fluid, wherein each micelle comprises a solid hydrophobic core particle comprising a phase change material having a melting point in the range of 30° C. to 100° C. and one or more emulsifiers forming a micellar shell around the solid hydrophobic core particle.

Embodiment 50 provides the method or system of embodiment 49, wherein the micelles have a mean particle size diameter in the range of 0.1 µm to 1.5 µm, or 0.1 µm to 1 µm, or 0.1 µm to 0.8 µm, or 0.1 µm to 0.6 µm, or 0.1 µm to 0.5 µm, or 0.1 µm to 0.4 µm, or 0.2 µm to 1 µm, or 0.2 µm to 0.8 µm, or 0.2 µm to 0.6 µm, or 0.2 µm to 0.5 µm, or 0.2 µm to 0.4 µm, or 0.4 µm to 1 µm, or 0.4 µm to 0.8 µm, or 0.4 µm to 0.6 µm, or 0.4 µm to 0.5 µm, or 0.3 µm to 0.5 µm, or 0.35 µm to 0.45 µm.

Embodiment 51 provides the method or system of embodiment 49 of 50, wherein the one or more emulsifiers is substantially bound into the micelles, e.g., wherein less than 5 wt % of the one or more emulsifiers is present in the aqueous solution in an unbound state, or less than 2 wt %, or less than 1 wt %, or less than 0.1 wt %, or less than 0.01 wt %, or even less than 0.001 wt % based on the total weight of the emulsion.

Embodiment 52 provides the method or system of any of embodiments 49-51, wherein the phase change material is a waxy material.

Embodiment 53 provides the method or system of any of embodiments 49-52, wherein the phase change material is paraffin.

Embodiment 54 provides the method or system of any of embodiments 49-52, wherein the phase change material is 1-cyclohexylooctadecane, 4-heptadacanone, quinone, benzamide, or a mixture thereof.

Embodiment 55 provides the method or system of any of embodiments 49-54, wherein the phase change material has a melting point of at least 30° C.; e.g., at least 50° C., or at least 70° C., or in the range of 30° C. to 100° C.

Embodiment 56 provides the method or system of any of embodiments 49-55, wherein the micelles comprise one phase change material.

Embodiment 57 provides the method or system of any of embodiments 49-56, wherein the micelles comprise a first set of micelles having solid hydrophobic core particles comprising a first phase change material, and a second set of micelles having solid hydrophobic core particles comprising a second phase change material different from the first phase change material.

Embodiment 58 provides the method or system of any of embodiments 49-57, wherein the phase change material is present in the composition in an amount of 1 wt % to 70 wt % based on the total weight of the emulsion, e.g., in an amount of 1 wt % to 50 wt %, or 1 wt % to 30 wt %, or 1 wt % to 15 wt %, or 1 wt % to 10 wt %, or 1 wt % to 5 wt %, or 2 wt % to 70 wt %, or 2 wt % to 50 wt %, or 2 wt % to 30 wt %, or 2 wt % to 15 wt %, or 2 wt % to 10 wt %, or 5 wt % to 70 wt %, or 5 wt % to 50 wt %, or 5 wt % to 30 wt %, or 5 wt % to 15 wt %, or 10 wt % to 70 wt %, or 10 wt % to 50 wt %, or 10 wt % to 30 wt %, or 20 wt % to 70 wt %, or 20 wt % to 50 wt %, or 40 wt % to 70 wt % based on the total weight of the emulsion.

Embodiment 59 provides the method or system of any of embodiments 49-58, wherein the one or more emulsifiers is selected from the group consisting of molecules having the structure hydrocarbyl group—aryl group—polyether group.

Embodiment 60 provides the method or system of any of embodiments 23-59 wherein the first thermal management fluid and/or the second thermal management fluid independently have a heat capacity of at least 1 J/g·K at 25° C.

Embodiment 61 provides the method or system of any of embodiments 23-60 wherein the first thermal management fluid and/or the second thermal management fluid independently have a thermal conductivity in the range of 0.05 W/m K to 1 W/m K at 40° C.

Embodiment 62 provides the method or system of any of embodiments 23-61 wherein the first thermal management fluid and/or the second thermal management fluid independently have a kinematic viscosity of 3 to 40 cSt at 40° C.

Embodiment 63 provides the method or system of any of embodiments 1-48, wherein the second thermal management fluid comprises:
one or more dielectric fluids present in a total amount in the range of 65 wt % to 99.9 wt %; and
one or more halocarbons each having a boiling point in the range of 30° C. to 150° C., present in a total amount in the range of 0.1 wt % to 35 wt %,
wherein the one or more halocarbons are homogeneously dispersed in the first thermal management fluid;
wherein the dielectric thermal management fluid has a dielectric constant of at least 1.5 at 25° C.; and
wherein a flash point of the first thermal management fluid is above the boiling point of the one or more halocarbons.

Embodiment 64 provides the method or system of embodiment 63, wherein each of the one or more dielectric fluids is selected from aliphatic dielectric fluids (e.g., $C_{14}$-$C_{50}$ alkyls, $C_{14}$-$C_{50}$ alkenyls, $C_{14}$-$C_{50}$ alkynyls, polyolefins such as poly-α-olefin), aliphatic dielectric fluid oxygenates (e.g., ketones, ethers, esters, or amides), aromatic dielectric fluids (e.g., dialkylbenzene such as diethylbenzene, cyclohexylbenzene, 1-alkylnaphthalene, 2-alkylnaphthalene, dibenzyltoluene, and alkylated biphenyl), aromatic dielectric fluid oxygenates (e.g., ketones, ethers, esters, or amides), silicones (e.g., silicone oil and silicate ester), and any combination thereof; or wherein each of the one or more dielectric fluids is selected from $C_{14}$-$C_{50}$ alkyls, polyolefins, and any combination thereof; or wherein each of the one or more dielectric fluids is a mineral oil or a silicone oil.

Embodiment 65 provides the method or system of embodiment 63 or 64, wherein the one or more halocarbons comprises a first halocarbon having a boiling point in the range of 30° C. to 50° C. and a second halocarbon having a boiling point in the range of 80° C. to 110° C.

Embodiment 66 provides the method or system of any of embodiments 63-65, wherein each of the one or more halocarbons includes as its halogen(s) one or more or chlorine, fluorine and bromine; or wherein each of the one or more halocarbons is selected from fluorocarbon, chlorocarbon, and chlorofluorocarbon; or wherein the one or more halocarbons include a fluorocarbon and a chlorocarbon (such as dichloromethane).

Embodiment 67 provides the method or system of any of embodiments 63-65, wherein at least one of the one or more halocarbons is a chlorocarbon selected from chloroalkanes and oxygenates thereof (such as dichloromethane, chloroform, and 1,1,1-trichloroethane), chloroalkene and oxygenate thereof (such as trans-1,2-dichloroethylene and cis-1,2-dichloroethylene), and chloroaromatic compounds; or wherein each of the one or more halocarbons is a fluorocarbon; or wherein at least one of the one or more halocarbons is a fluorocarbon selected from fluoroalkanes and oxygenates thereof (such as perfluoropentane, perfluorohexane, perfluoroheptane, perfluorocyclohexane, perfluoromethylcyclohexane, 2H,3H-perfluoropentane, perfluoro (2-methyl-3-pentanone), methyl nonafluorobutyl ether, ethyl nonafluorobutyl ether, methoxy-nonafluorobutane, ethoxy-nonafluorobutane, tetradecafluoro-2-methylhexan-3-one, and tetradecafluoro-2,4-dimethylpentan-3-one), 3-methoxyperfluoro(2-methylpentane), 3-ethoxyperfluoro(2-methylpentane) fluoroalkenes and oxygenate thereof (such as perfluorohexene), and fluoroaromatic compounds (such as perfluorobenzene).

Embodiment 68 provides the method or system of any of embodiments 1-48, wherein the second thermal management fluid comprises one or more dielectric fluids selected from mineral oil, transformer oil, engineered oil, silicone oil, and fluorocarbon oil.

Embodiment 69 provides the method or system of any of embodiments 1-48, wherein the second thermal management fluid comprises one or more glycols and water (e.g., at least 75 wt %, at least 80 wt %, at least 85 wt %, at least 90 wt %, at least 95%, or even at least 98 wt % of the total weight of the second thermal management fluid is made up of the one or more glycols and water).

Embodiment 70 provides the method or system of any of embodiments 1-67, wherein
(a) the first thermal management fluid comprises:
one or more dielectric fluids present in a total amount in the range of 65 wt % to 99.9 wt %; and
one or more halocarbons each having a boiling point in the range of 30° C. to 150° C., present in a total amount in the range of 0.1 wt % to 35 wt %,
wherein the one or more halocarbons are homogeneously dispersed in the first thermal management fluid;
wherein the dielectric thermal management fluid has a dielectric constant of at least 1.5 at 25° C.; and
wherein a flash point of the first thermal management fluid is above the boiling point of the one or more halocarbons;
and
(b) the second thermal management fluid comprises:
an aqueous carrier fluid; and
a dispersion of micelles within the aqueous carrier fluid, wherein each micelle comprises a solid hydrophobic core particle comprising a phase change material having a melting point in the range of 30° C. to 100° C. and one or more emulsifiers forming a micellar shell around the solid hydrophobic core particle.

It will be apparent to those skilled in the art that various modifications and variations can be made to the systems and methods described here without departing from the scope of the disclosure. Thus, it is intended that the present disclosure cover such modifications and variations of this invention provided they come within the scope of the appended claims and their equivalents.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

We claim:

1. A system comprising:
an electric heat source;
a first heat exchanger having a first portion and a second portion;
a first fluid circuit in substantial thermal contact with the electric heat source and configured to circulate a first thermal management fluid between the electric heat source and the first portion of the first heat exchanger, wherein the first fluid circuit is configured such that the first thermal management fluid can absorb heat from the electric heat source and can dissipate heat in the first heat exchanger; and
a second fluid circuit configured to pass a second thermal management fluid over the second portion of the first heat exchanger and absorb heat from the second portion of the first heat exchanger,
wherein
the second thermal management fluid comprises:
an aqueous carrier fluid; and
a dispersion of micelles within the aqueous carrier fluid, wherein each micelle comprises a solid hydrophobic core particle comprising a phase change material having a melting point in the range of 30° C. to 100° C. and one or more emulsifiers forming a micellar shell around the solid hydrophobic core particle.

2. The system of claim 1, further comprising a second heat exchanger in substantial thermal contact with the second fluid circuit, the second heat exchanger being configured to dissipate heat from the second fluid circuit.

3. The system of claim 1, wherein the first fluid circuit comprises an expansion chamber configured to receive a vapor from the first thermal management fluid.

4. The system of claim 3, further comprising a third heat exchanger having a first portion and a second portion, where the first portion of the third heat exchanger is configured to absorb heat from the expansion chamber and the second portion of the third heat exchanger is configured to dissipate heat from the first portion of the third heat exchanger.

5. The system of claim 4, wherein the second fluid circuit comprises the second portion of the third heat exchanger, wherein the second portion of the third heat exchanger is configured to receive the second thermal management fluid that can absorb heat from the expansion chamber through the second portion of the third heat exchanger and can dissipate heat in the second heat exchanger.

6. The system of claim 4, further comprising a third fluid circuit configured to circulate a third thermal management fluid between the second portion of the third heat exchanger and a fourth heat exchanger, wherein the third fluid circuit is configured such that the third thermal management fluid can absorb heat from the expansion chamber through the second portion of the third heat exchanger and can dissipate heat in the fourth heat exchanger.

7. The system of claim 1, wherein the first thermal management fluid comprises:
one or more dielectric fluids present in a total amount in the range of 65 wt/o to 99.9 wt %; and
one or more halocarbons each having a boiling point in the range of 30° C. to 150° C., present in a total amount in the range of 0.1 wt % to 35 wt %,
wherein the one or more halocarbons are homogeneously dispersed in the first thermal management fluid;
wherein the dielectric thermal management fluid has a dielectric constant of at least 1.5 at 25° C.; and
wherein a flash point of the first thermal management fluid is at least 90° C. measured in accordance with ASTM D56.

8. The system of claim 1, wherein the second thermal management fluid comprises:
an aqueous carrier fluid; and
a dispersion of micelles within the aqueous carrier fluid, wherein each micelle comprises a solid hydrophobic core particle comprising a phase change material having a melting point in the range of 30° C. to 70 ° C. and one or more emulsifiers forming a micellar shell around the solid hydrophobic core particle.

9. A method comprising:
circulating a first thermal management fluid in a first fluid circuit and between an electrical heat source and a first portion of a first heat exchanger;
absorbing thermal energy in the first thermal management fluid from the electrical heat source;
dissipating thermal energy from the first thermal management fluid into the first heat exchanger; and
circulating a second thermal management fluid in a second fluid circuit and over a second portion of the first heat exchanger; and
absorbing heat from the first exchanger into the second thermal management fluid:
wherein the second thermal management fluid comprises:
an aqueous carrier fluid; and
a dispersion of micelles within the aqueous carrier fluid, wherein each micelle comprises a solid hydrophobic core particle comprising a phase change material having a melting point in the range of 30° C. to 100° C. and one or more emulsifiers forming a micellar shell around the solid hydrophobic core particle.

10. The method of claim 9, further comprising absorbing thermal energy in the second thermal management fluid from the first heat exchanger; and
dissipating thermal energy from the second thermal management fluid into a second heat exchanger.

11. The method of claim 9, further comprising:
receiving a vapor from the first thermal management fluid in an expansion chamber of the first fluid circuit.

12. The method of claim 9, wherein the first thermal management fluid comprises one or more halocarbons and the thermal energy from the heat source is absorbed by vaporizing one or more of the halocarbons of the first thermal management fluid.

13. The method of claim 9, wherein the first thermal management fluid comprises:
one or more dielectric fluids present in a total amount in the range of 65 wt % to 99.9 wt %; and
one or more halocarbons each having a boiling point in the range of 30° C. to 150° C., present in a total amount in the range of 0.1 wt % to 35 wt %,
wherein the one or more halocarbons are homogeneously dispersed in the first thermal management fluid;
wherein the dielectric thermal management fluid has a dielectric constant of at least 1.5 at 25° C.; and
wherein a flash point of the first thermal management fluid is above the boiling point of the one or more halocarbons.

14. The method of claim 13, wherein the one or more dielectric fluids is selected from aliphatic dielectric fluids, aliphatic dielectric fluid oxygenations, aromatic dielectric fluids, aromatic dielectric fluid oxygenations, silicones, and any combination thereof.

15. The method of claim 13, wherein each of the one or more halocarbons is selected from a fluorocarbon, chlorocarbon, and chlorofluorocarbon.

16. The method of claim 9, wherein the dispersion of micelles have a d50 value in the range of 0.1 to 1.5 μm.

17. The method of claim 9, wherein the dispersion of micelles have a d10 that is no less than 75% of the d50 and a d90 that is no more than 125% of the d50.

* * * * *